United States Patent
Kato et al.

(10) Patent No.: US 8,046,474 B2
(45) Date of Patent: Oct. 25, 2011

(54) METHOD, APPARATUS, PROGRAMS AND STORAGE MEDIUM FOR TRANSFERRING DATA BETWEEN DIFFERENT TYPES OF TERMINALS

(75) Inventors: Tetsuya Kato, Kawasaki (JP); Akinobu Toda, Kawasaki (JP); Hideyuki Motoyama, Kawasaki (JP); Noriyuki Fukuyama, Kawasaki (JP); Masahide Noda, Kawasaki (JP); Ichiro Iida, Kawasaki (JP); Nobutsugu Fujino, Kawasaki (JP); Shigeki Fukuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 996 days.

(21) Appl. No.: 10/923,747

(22) Filed: Aug. 24, 2004

(65) Prior Publication Data
US 2005/0210148 A1 Sep. 22, 2005

(30) Foreign Application Priority Data
Mar. 19, 2004 (JP) .................................. 2004-079590

(51) Int. Cl.
*G06F 15/16* (2006.01)
(52) U.S. Cl. ......... 709/228; 709/244; 709/241; 709/207
(58) Field of Classification Search .................. 709/240, 709/241, 207, 232, 238, 206; 379/93.01, 379/114.02
See application file for complete search history.

(56) References Cited

U.S. PATENT DOCUMENTS

| 5,933,425 | A  | * | 8/1999  | Iwata ........................... 370/351 |
| 6,078,946 | A  | * | 6/2000  | Johnson ........................ 709/200 |
| 6,345,303 | B1 | * | 2/2002  | Knauerhase et al. ......... 709/238 |
| 6,356,541 | B1 | * | 3/2002  | Muller et al. ................. 370/338 |
| 6,374,246 | B1 | * | 4/2002  | Matsuo ............................ 707/10 |
| 6,426,955 | B1 | * | 7/2002  | Gossett Dalton et al. .... 370/401 |
| 6,538,996 | B1 | * | 3/2003  | West et al. ..................... 370/238 |
| 6,542,819 | B1 | * | 4/2003  | Kovacs et al. ................. 701/213 |
| 6,765,920 | B1 | * | 7/2004  | Tari et al. ....................... 370/401 |
| 6,856,807 | B1 | * | 2/2005  | Raith ........................... 455/456.1 |
| 6,920,322 | B2 | * | 7/2005  | Ikeda et al. ................. 455/426.1 |
| 6,941,345 | B1 | * | 9/2005  | Kapil et al. ................... 709/206 |
| 6,965,948 | B1 | * | 11/2005 | Eneborg et al. ............... 709/250 |
| 7,143,171 | B2 | * | 11/2006 | Eriksson et al. .............. 709/227 |

(Continued)

FOREIGN PATENT DOCUMENTS

EP 1 398 942 3/2004

(Continued)

OTHER PUBLICATIONS

S. Arbanowski et al., "Service personalization for unified messaging systems", Computers and Communications , 1999, Proceedings, IEEE Int'l Symposium on Red Sea, Egypt Jul. 6-8, 1999, Los Alamitos, CA, IEEE Comput. Soc. Jul. 6, 1999, pp. 156-163, XP010555030.

(Continued)

*Primary Examiner* — Hassan Phillips
*Assistant Examiner* — Madhu Woolcock
(74) *Attorney, Agent, or Firm* — Staas & Halsey LLP

(57) ABSTRACT

A communications terminal selection unit acquires, upon receipt of a call origination request, presence information including terminal information on terminals available to a call terminator from a presence management unit, and selects a specific terminal, if there are a plurality of terminals available to the call terminator based on the presence information, based on terminal selection information in which at least whether communication quality or charge takes priority is defined beforehand by the call terminator, notifying a call transfer unit of the selected terminal as a transfer destination terminal for call transfer.

12 Claims, 34 Drawing Sheets

U.S. PATENT DOCUMENTS

| | | | |
|---|---|---|---|
| 7,251,696 B1 * | 7/2007 | Horvitz | 709/228 |
| 7,373,428 B1 * | 5/2008 | Armstrong et al. | 709/249 |
| 2003/0055908 A1 * | 3/2003 | Brown et al. | 709/207 |
| 2004/0054803 A1 | 3/2004 | Ying et al. | |
| 2004/0122951 A1 * | 6/2004 | Beck et al. | 709/227 |

FOREIGN PATENT DOCUMENTS

| | | |
|---|---|---|
| EP | 1 398 942 A2 * | 3/2004 |
| JP | 06-326930 | 11/1994 |
| JP | 09-186917 | 7/1997 |
| JP | 11-39570 | 2/1999 |
| JP | 2003-3324472 | 11/2003 |
| JP | 2003-3324485 | 11/2003 |

OTHER PUBLICATIONS

J. C. Tang et al., Association for Computing Machinery: "Connexus to Awarenex: Extending Awareness to Mobile Users", Chi 2001 Conference Proceedings, Conference on Human Factors in Computing Systems, Seattle, WA, Mar. 31-Apr. 5, 2001, Mar. 31, 2001, pp. 221-228 XP001090377.

Search Report for corresponding European Appln No. 04255171.3 dated Jun. 14, 2005.

Japanese Office Action for corresponding Japanese Application 2001-140925; dispatched Nov. 4, 2008.

* cited by examiner

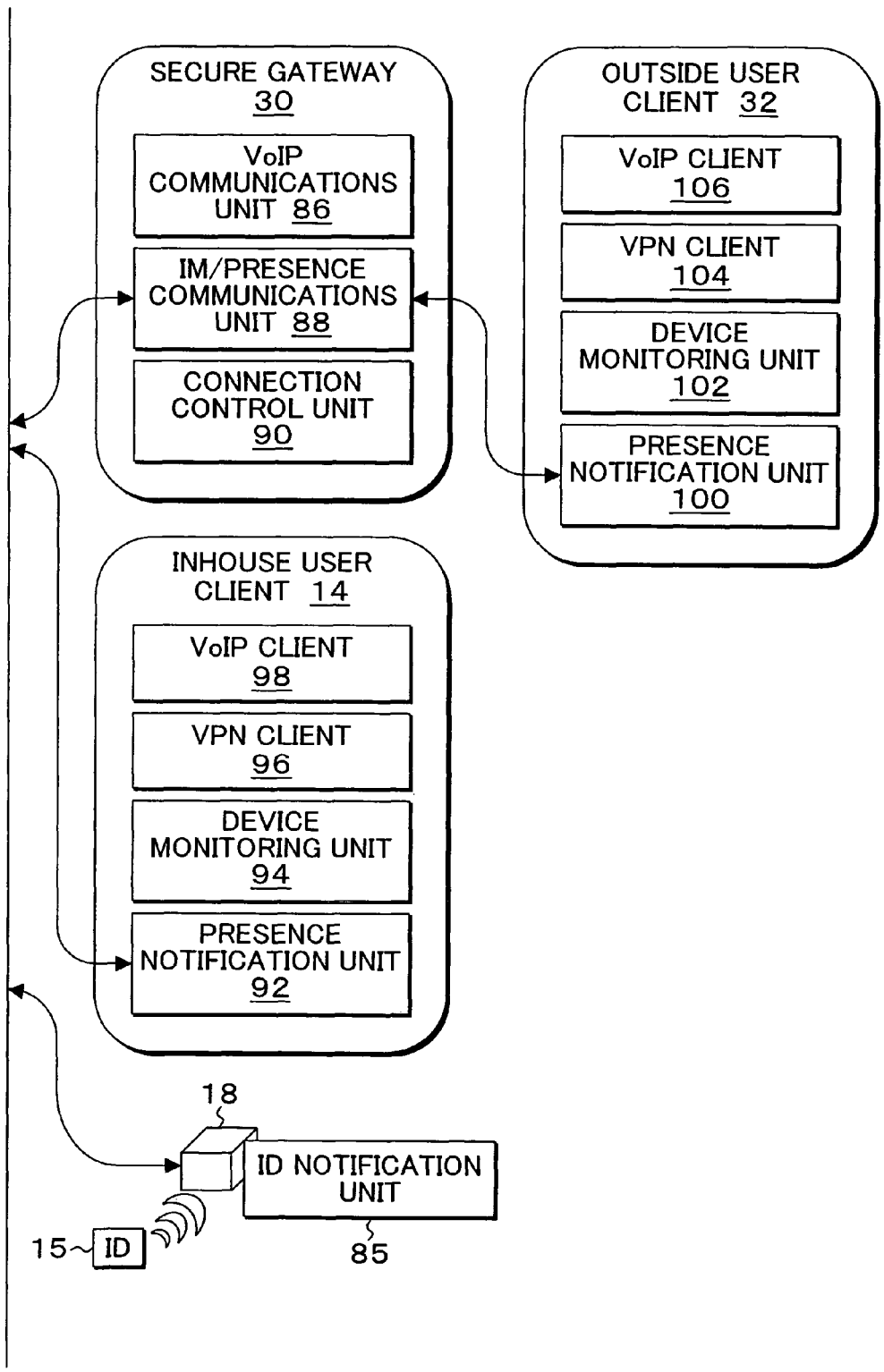

FIG. 3

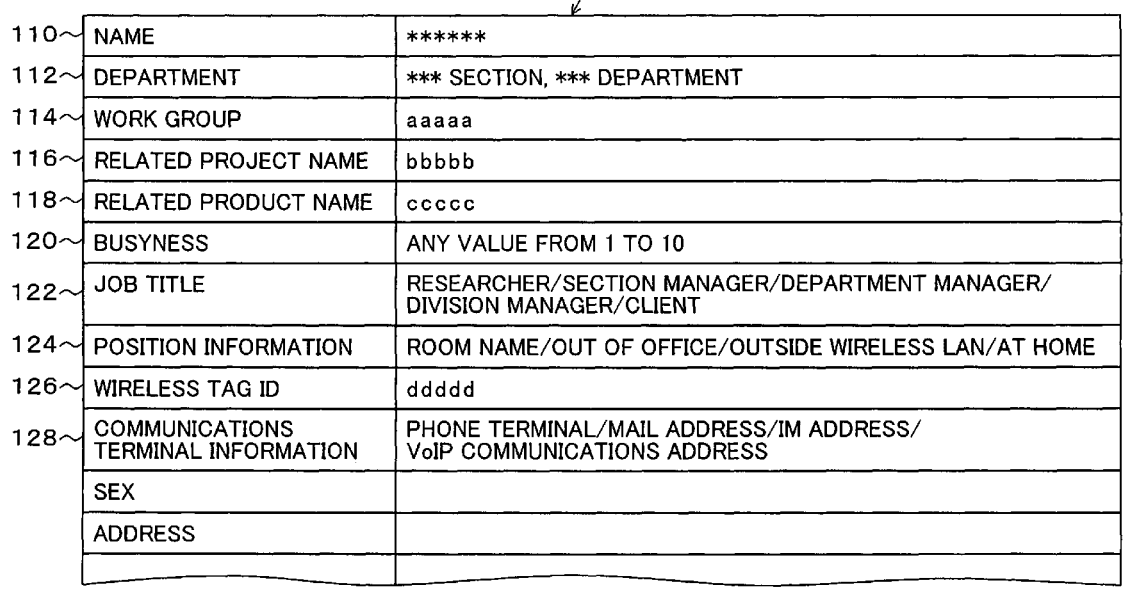

| 110 | NAME | ****** |
|---|---|---|
| 112 | DEPARTMENT | *** SECTION, *** DEPARTMENT |
| 114 | WORK GROUP | aaaaa |
| 116 | RELATED PROJECT NAME | bbbbb |
| 118 | RELATED PRODUCT NAME | ccccc |
| 120 | BUSYNESS | ANY VALUE FROM 1 TO 10 |
| 122 | JOB TITLE | RESEARCHER/SECTION MANAGER/DEPARTMENT MANAGER/ DIVISION MANAGER/CLIENT |
| 124 | POSITION INFORMATION | ROOM NAME/OUT OF OFFICE/OUTSIDE WIRELESS LAN/AT HOME |
| 126 | WIRELESS TAG ID | ddddd |
| 128 | COMMUNICATIONS TERMINAL INFORMATION | PHONE TERMINAL/MAIL ADDRESS/IM ADDRESS/ VoIP COMMUNICATIONS ADDRESS |
| | SEX | |
| | ADDRESS | |
| | | |

| | ITEM | DESCRIPTION |
|---|---|---|
| 132 | CONTACT MEDIA | TAG REPRESENTING USER CONTACT TERMINAL.<br>ATTRIBUTE INFORMATION "Mtype" : INDICATES A CONTACT TERMINAL TYPE AMONG FIXED PHONE(phone), INSTANT MEDIA(im), http AND MAIL(mail). |
| 134 | STATUS | INDICATES WHETHER THE TERMINAL REPRESENTED BY THE CONTACT MEDIA IS AVAILABLE. |
| 136 | UID | ADDRESS OF THE CONTACT MEDIA. SIP ADDRESS USED FOR ALL PHONE TYPES.<br>ATTRIBUTE INFORMATION "Mtype" : STIPULATES, FOR EXAMPLE, FIXED PHONE (fixed), MOBILE PHONE(pdc), PHS(phs) AND VoIP SOFTWARE(voip) FOR PHONE AS DETAILED TYPE OF CONTACT TERMINAL. |
| 138 | MEDIA PROFILE | DETAILED INFORMATION ABOUT THE CONTACT TERMINAL. |
| 140 | PHONE TYPE | INDICATES WHETHER THE CONTACT TERMINAL IS INTERACTIVE OR RECORDING. |
| 142 | CHARGE | REPRESENTS USAGE COST OF THE CONTACT TERMINAL.<br>ATTRIBUTE INFORMATION "type" : INDICATES CHARGING TYPE AND STIPULATES TIME CHARGING(YEN/MIN) -time- AND DATA CHARGING(YEN/1Kbyte) - data. |
| 144 | BANDWIDTH | ACCEPTS COMMUNICATION BANDWIDTH INFORMATION(bps) OF THE CONTACT TERMINAL AS INPUT. |
| 146 | DELAY | ACCEPTS COMMUNICATION DELAY INFORMATION(SEC) OF THE CONTACT TERMINAL AS INPUT. |

FIG. 5

| ITEM | DESCRIPTION |
|---|---|
| 150 — TRANSFER EVENT ID | Call Routing ID |
| 152 — CALL ORIGINATOR TERMINAL ID | Call Routed Call ID |
| 154 — TRANSFER MONITORING REGISTRATION ID | Call Route Register Req. ID |
| 156 — CURRENT TRANSFER DESTINATION NUMBER | Call Current Route |
| 158 — CALL ORIGINATION NUMBER | Call Calling Device |
| 160 — CALL TERMINATION NUMBER | Call Routing Device |
| 162 — CALL PRIORITY LEVEL | Call Priority |

| | | |
|---|---|---|
| 166~ | ROOM ITEM | TERMINAL INFORMATION IN A SINGLE ROOM.<br>ATTRIBUTE INFORMATION "name" : ROOM NAME |
| 168~ | LOCATION AREA | ROOM AREA INFORMATION REPRESENTING THE ROOM LOCATION AND RANGE.<br>ATTRIBUTE "type" : ROOM SHAPE(sphere/square) |
| 170~ | CANTACT | INCLUDES CONTACT MEDIA FORMAT TERMINAL INFORMATION AND REPRESENTS A USER-SPECIFIC TERMINAL WITH ADDITION OF ATTRIBUTE INFORMATION "paid".<br>REPRESENTS A COMMON TERMINAL WITHOUT "paid". |

| FILTER ID | FILTER DESCRIPTION |
|---|---|
| FL1 | SELECTS CALL TERMINAL IF CALL TERMINATOR BUSYNESS IS LOWER THAN CALL PRIORITY LEVEL AND SELECTS RECORDED SERVICE IN ANY OTHER CASES. |
| FL2 | SELECTS CALL TERMINAL IF CALL TERMINATOR JOB TITLE IS LOWER THAN THAT OF CALL ORIGINATOR AND SELECTS RECORDED SERVICE IN ANY OTHER CASES. |
| FL3 | SELECTS CALL TERMINAL IF CALL TERMINATOR BUSYNESS IS LOWER THAN CALL PRIORITY LEVEL AND SELECTS RECORDED SERVICE IN ANY OTHER CASES. HOWEVER, THIS FILTER SELECTS CALL TERMINAL, AS AN EXCEPTION, IF A SPECIFIC PROJECT NAME IS CONTAINED IN THE CALL ORIGINATOR'S RELATED PROJECT NAME. |

FIG. 8

| LIST ID | USER-REQUESTED CONDITION | EVALUATION FUNCTION (WAIT & VALUE) |
|---|---|---|
| PD1 | PRIORITY GIVEN TO TERMINAL WITH HIGH CALL QUALITY AND INEXPENSIVE CALL CHARGE | W1=10, W3=5, W4=10, V=10<br>W2=0 |
| PD2 | PRIORITY GIVEN TO CALL QUALITY IF CALL TERMINATOR IS LOWER THAN CALL ORIGINATOR IN JOB TITLE | W1=10, W2=100<br>W3, W4, V=0 |
| PD3 | PRIORITY GIVEN TO CALL CHARGE IF CALL TERMINATOR IS EQUAL TO OR HIGHER THAN CALL ORIGINATOR IN JOB TITLE | W3, W4=10<br>W1, W2, V=0 |
| PD4 | USE OF VoIP PHONE DESIRED | W1, W2, W3=0, W4=−10<br>V FOR VoIP PHONE WITH SPECIFIC ID=100 |
| PD5 | USE OF TV-EQUIPPED PHONE DESIRED | W1, W2, W3, W4=0<br>V FOR TV-EQUIPPED PHONE=100 |

FIG. 9

| RULE ID | RULE DESCRIPTION | TERMINAL FILTER | PRIORITY LEVEL INFORMATION |
|---|---|---|---|
| R1 | SELECTION ACCORDING TO BUSYNESS | FL1 | PD1 |
| R2 | SELECTION ACCORDING TO JOB TITLE | FL1, FL2 | PD2, PD3 |
| R3 | SELECTION ACCORDING TO PROJECT | FL3 | PD2 |
| R4 | SELECTION ACCORDING TO INDIVIDUAL NAME/USER ID | FL1 | PD4 |
| R5 | SELECTION ACCORDING TO CALL CAPABILITY OF CALL ORIGINATOR | FL1 | PD5 |

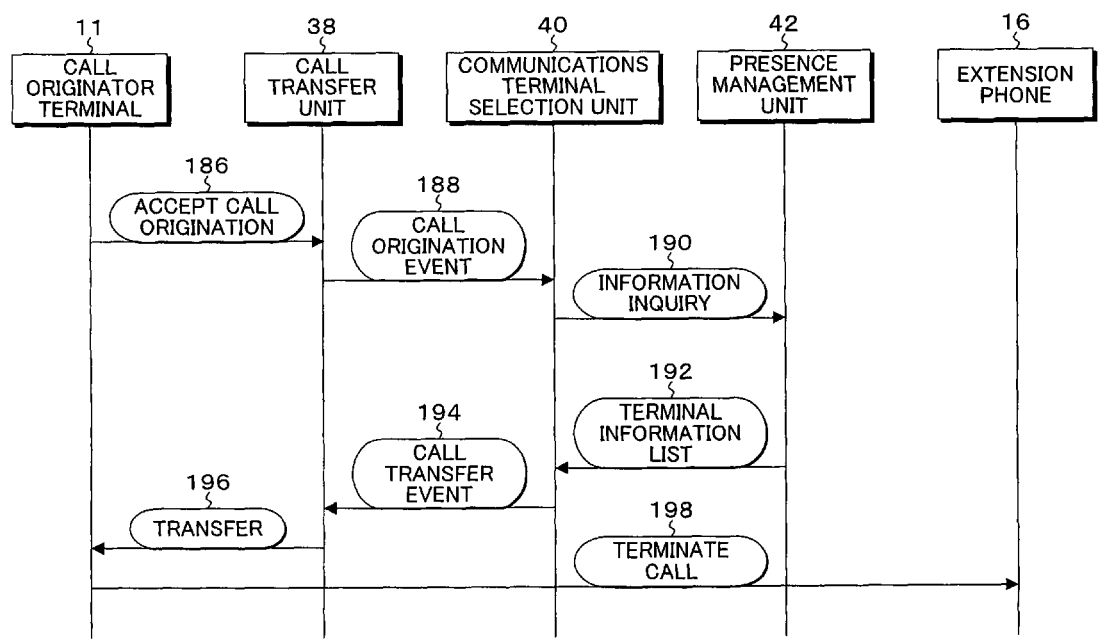

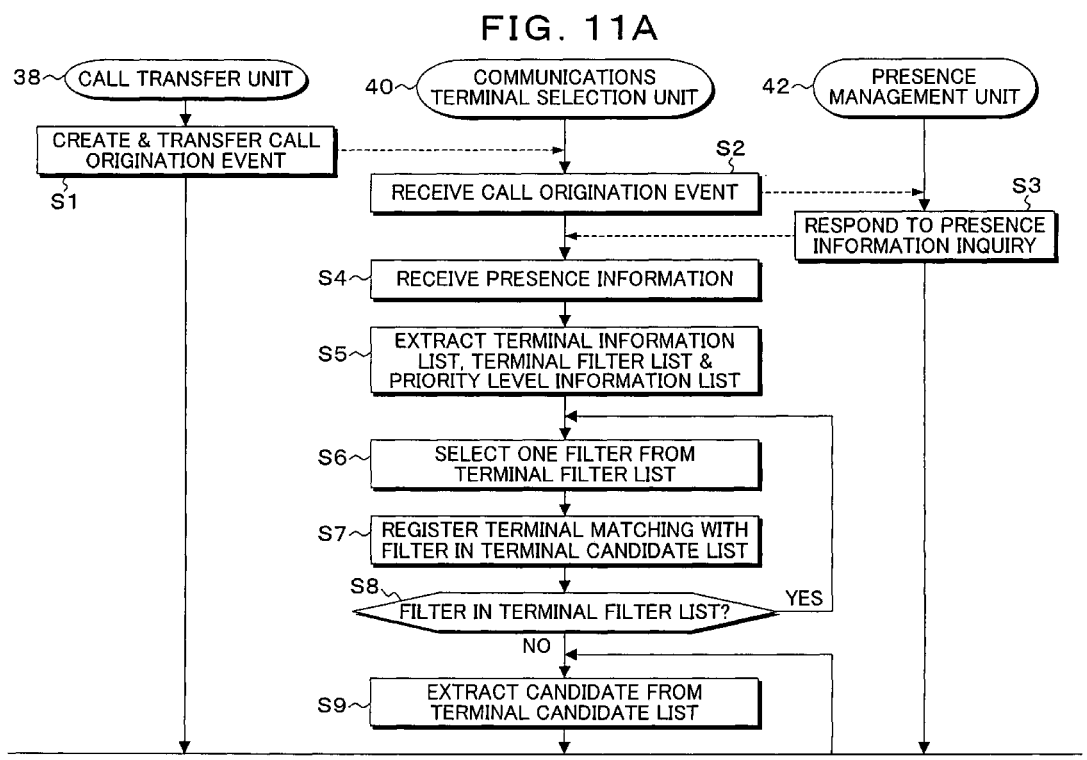

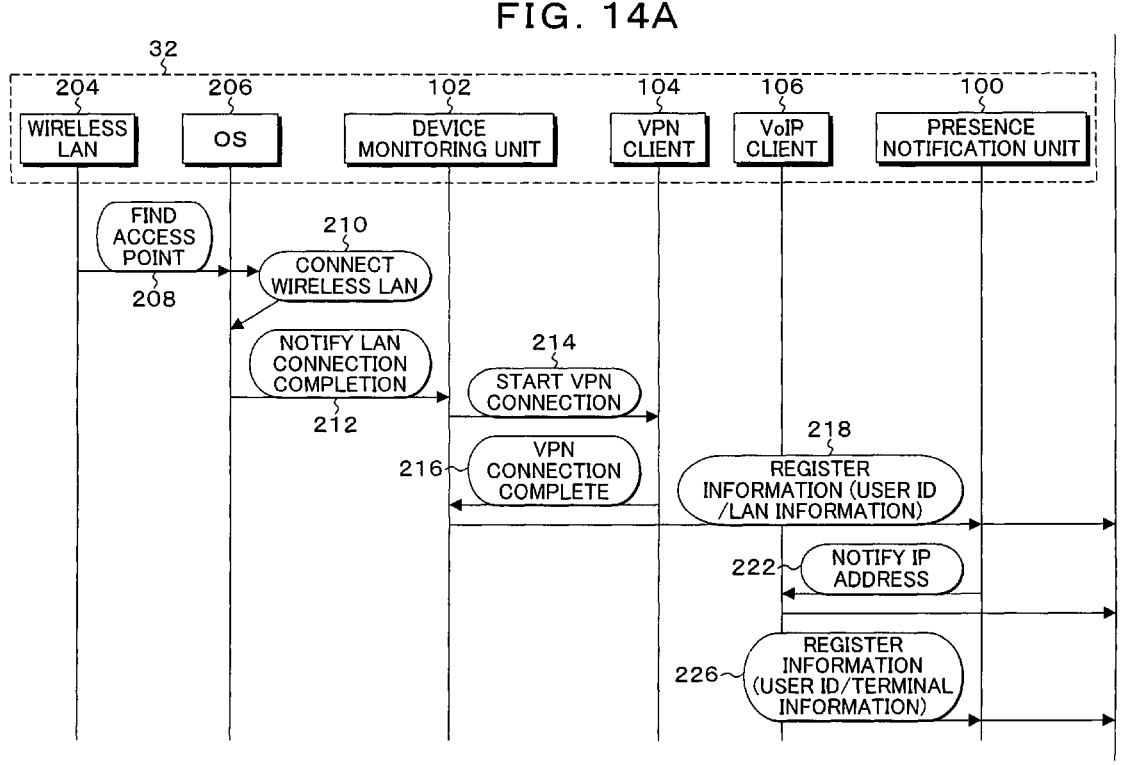

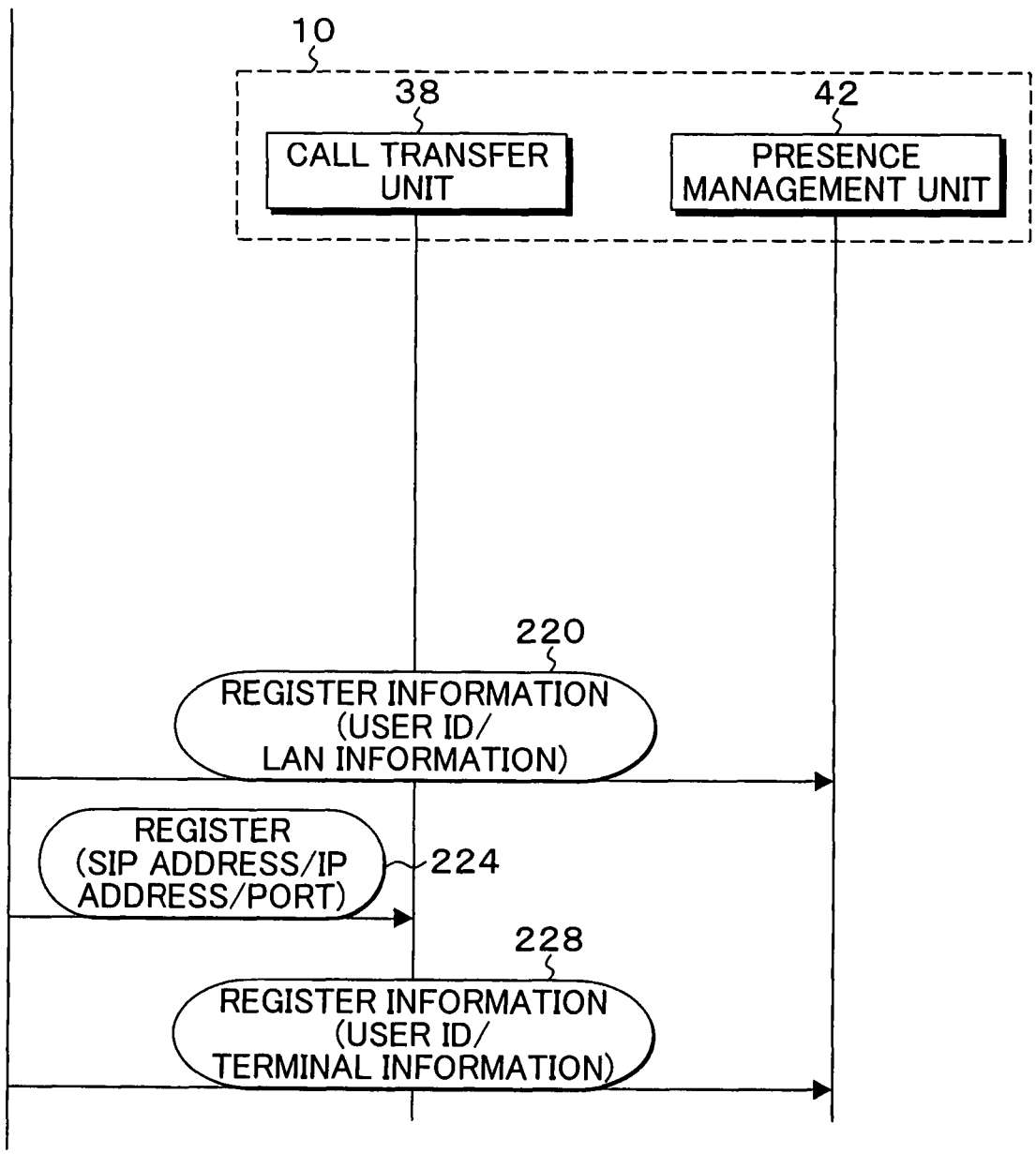

260

COMPANY A's SALES DEPARTMENT
PHONEBOOK

SELECT WHO YOU WISH TO SPEAK TO

· TARO AKAWA : DEPT. MANAGER
· ICHIRO BYAMA : DEPT. MANAGER
· JIRO CDA : IN CHARGE OF PRODUCT C
· HANAKO DKI : IN CHARGE OF PRODUCT D

262

CALLING
JIRO CDA IN CHARGE OF PRODUCT C.
IS IT OK?

YES / NO

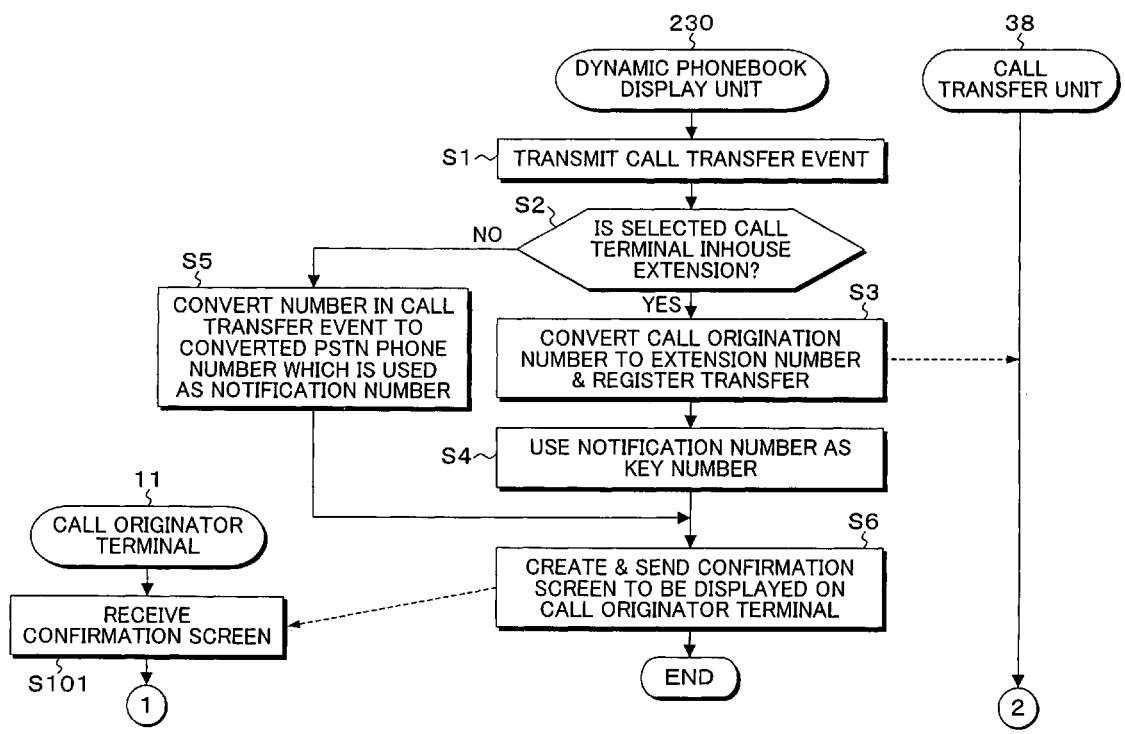

METHOD, APPARATUS, PROGRAMS AND STORAGE MEDIUM FOR TRANSFERRING DATA BETWEEN DIFFERENT TYPES OF TERMINALS

BACKGROUND OF THE INVENTION

1. Field of the Invention

The present invention relates generally to a method, apparatus, programs and storage medium for transferring data between different types of terminals for transferring call such as telephone, instant message, http and mail to an available terminal based on presence information, and more particularly to a method, apparatus, programs and storage medium for transferring data between different types of terminals for dynamically selecting the optimum terminal based on user's conditions and transferring call when a plurality of terminals are selected such as fixed phone, mobile phone and VoIP phone.

2. Description of the Related Arts

Recent years have witnessed rapid diversification of work style and communications infrastructure. For instance, office with no personal desk and telecommuting are among forms of office working style that are being practiced. Among communications terminals are extension phone, mobile phone, notebook PC, PDA and VoIP phone, with the nature of communications also diversified into call, instant message, http and mail. In such an environment facing diversified work styles and communications infrastructure, a single user can use a plurality of different communications terminals, and a service is being contemplated that would properly grasp in real time communications terminals available to the user using a presence system and, upon receipt of a request for call origination, select a specific communications terminal based on presence information and transfer the call. This call transfer service is not limited to extension phone when a call origination request is made from an external network to the user, and call may be transferred by selecting the user terminal on the external network based on presence information.

Means for managing presence information required for call transfer service include personal management system for managing, in a comprehensive and timely manner, a plurality of pieces of personal behavioral information such as personal information as to whether a person is at his desk, presence/absence information, schedule information, conference attendance information, discrimination for phone answering and building management based on personal information (see Japanese Patent Application Laid-Open Publication No. 1999-39570). On the other hand, to respond to value-added service demands—including high quality requested by end users only in specific voice communications such as business discussion and support service (specific call) and only in voice communications for reporting to police or fire department (emergency call), a technology is known that relates to a VoIP (Voice Over Internet Protocol) network system for transferring (including transmitting and exchanging) voice packets over IP (Internet Protocol) network and more particularly that relates to a VoIP network system for providing a value-added service by preferentially controlling calls associated with specific voice session (see Japanese Patent Application Laid-Open Publication No. 2003-324472). Further, a technology is known that establishes call to intranet and external network via DMZ (demilitarized zone) for establishing call between terminals connected to intranet and external network and implementing multimedia communications while at the same time ensuring intranet security (see Japanese Patent Application Laid-Open Publication No. 2003-324485). In such a call transfer service using conventional user presence information, however, while phone call can be transferred to where the receiver is at present by combining the receiver's whereabout information and the phone's transfer capability, this service does not specifically take into assumption that there are a plurality of terminals capable of receiving call. As a result of diversification of communications infrastructure, if a plurality of phones are available such as IP and ordinary phones where the receiver is now, there are demands to transfer call to the less expensive IP phone in the case of a call from the own company and to transfer call to the ordinary phone that, although being more expensive, offers better sound quality, rather than the IP phone with poor sound quality in the case of a customer call. However, the current call transfer service can only transfer call, even in the presence of a plurality of communications terminals available at the same location, to any one of the communications terminals that has been set in a fixed manner, making it impossible to properly respond to demands of users employing diversified communications terminals and preventing full use of the diversified communications infrastructure.

SUMMARY OF THE INVENTION

Thus, according to the present invention there are provided a method, apparatus, programs and storage medium for transferring data between different types of terminals for transferring call by selecting a communications terminal matching with user demand. The present invention provides a method of transferring data between different types of terminals. The method of transferring data between different types of terminals of the present invention comprises:

a presence information acquisition step of acquiring presence information including terminal information on terminals available to a call terminator upon receipt of a call origination request;

a terminal selection step of selecting a specific terminal based on terminal selection information in which the a call terminator at least defines in advance whether call quality or call charge takes priority if there are a plurality of terminals available to the call terminator based on the presence information; and a call transfer step of notifying of a selected terminal as transfer destination to allow call transfer.

Herein, a terminal type is set such as phone, instant message, http and mail as a first terminal attribute in the terminal information, and details of the phone are set such as fixed phone, mobile phone, PHS, and VoIP phone as a second terminal attribute in the terminal information. The terminal selection step includes selecting a specific terminal or service based on a terminal filter defining a terminal selection condition that is based on which is larger or smaller of a first evaluation value held by a call originator and a second evaluation value held by a call terminator. The terminal selection step includes selecting a specific terminal or service based on which is larger or smaller of call originator's call priority level and call terminator's busyness. For example, a terminal selection condition is set in advance in the terminal filter for selecting a specific terminal or service through comparison of call originator's call priority level and call terminator's busyness. A terminal selection condition is set in advance in the terminal filter for selecting a call terminal if busyness is lower than call originator's call priority level and for selecting recorded service in any other cases. A terminal selection condition is set in advance in the terminal filter for selecting a specific terminal or service through comparison of job titles of the call originator and the call terminator. For example, a terminal selection condition is set in advance in the terminal filter for selecting a call terminal if the call terminator is lower than the call originator in job title and for selecting recorded service in any other cases. The terminal selection step includes selecting a terminal with high call quality or with low communications charge based on priority level information if a plurality of call terminals are selected as terminal candidates based on the terminal filter. The terminal selection step includes setting a weighted communication bandwidth, weighted communications charge and priority level value as priority level information, finding a priority level using (weighted communication bandwidth)−(weighted communications charge)+(priority level value), and selecting a call terminal with highest priority level in absolute value so as to allow selection of a terminal with high quality and low charge. In this case, when it is desired to use a specific terminal if possible, a positive priority level value is set, while otherwise a negative priority level value is set. The terminal selection step includes, when selection of a terminal with high call quality is desired, setting weights for communications charge in the priority level information to zero, and selecting a call terminal with highest priority level. The terminal selection step includes, when selection of a terminal with low call charge is desired, setting weights for communications bandwidth in the priority level information to zero, and selecting a call terminal with highest priority level in absolute value. When selection of a specific terminal is desired independently of call quality and call charge, a priority level value of a terminal to be selected in the priority level information is set to a large value so as to assign the highest priority level in absolute value, with other weights being set to zero. The terminal selection step includes setting a weighted communication bandwidth, weighted communications delay, weighted time charging, weighted data charging, and priority level value as the priority level information, finding priority level using (weighted communication bandwidth)−(weighted communications delay)−(weighted time charging)−(weighted data charging)+(priority level value), and selecting a call terminal with highest priority level in absolute value so as to allow selection of a terminal with high quality and low charge.

In another aspect of the present invention, for the purpose of avoiding double charging, there is provided a dynamic phonebook display step of, when a communications terminal in an external network is selected as a transfer destination terminal by Web page referencing from a call originator's terminal in an external network, notifying the call originator's terminal of the phone number of the transfer destination terminal so as to allow the call originator's terminal to directly originate a call. Herein, the dynamic phonebook display step includes creating a confirmation screen that includes the phone number of the transfer destination terminal as a link and transferring the screen to the call originator's terminal. In a further aspect of the present invention, for the purpose of saving external numbers, there is provided a dynamic phonebook display step of, when a communications terminal in an internal network is selected as a transfer destination terminal by Web page referencing from a call originator's terminal in an external network, notifying the call originator's terminal of a key phone number so as to allow the call originator's terminal to make a call origination request, and converting the key phone number received through the call origination request to an internal network phone number of the transfer destination terminal so as to allow call transfer. Herein, the dynamic phonebook display step includes creating a confirmation screen that includes the key phone number as a link and transferring the screen to the call originator's terminal.

The present invention provides an apparatus for transferring data between different types of terminals. The apparatus for transferring data between different types of terminals of the present invention comprises a presence information acquisition unit for acquiring presence information including terminal information on terminals available to a call terminator upon receipt of a call origination request; a terminal selection unit for selecting a specific terminal based on terminal selection information in which the call terminator at least defines in advance whether call quality or call charge takes priority if there are a plurality of terminals available to the call terminator based on the presence information; and a call transfer unit for notifying of a selected terminal as transfer destination to allow call transfer. The present invention provides a program for call transfer executed by a computer. The program of the present invention causes a computer making up a call transfer server to execute:

a presence information acquisition step of acquiring presence information including terminal information on terminals available to a call terminator upon receipt of a call origination request;

a terminal selection step of selecting a specific terminal based on terminal selection information in which the call terminator at least defines in advance whether call quality or call charge takes priority if there are a plurality of terminals available to the call terminator based on the presence information; and a call transfer step of notifying of a selected terminal as transfer destination to allow call transfer.

The present invention provides a computer-readable storage medium having therein stored a program for call transfer. The storage medium of the present invention stores therein a program which causes a computer to execute:

a presence information acquisition step of acquiring presence information including terminal information on terminals available to a call terminator upon receipt of a call origination request;

a terminal selection step of selecting a specific terminal based on terminal selection information in which the call terminator at least defines in advance whether call quality or call charge takes priority if there are a plurality of terminals available to the call terminator based on the presence information; and a call transfer step of notifying of a selected terminal as transfer destination to allow call transfer.

It is to be noted that the details of the apparatus, programs and storage medium of the present invention for transferring data between different types of terminals are basically identical to those of the method of the present invention for transferring data between different types of terminals. According to the present invention, user definition of communications terminal selection conditions—conditions with regards to communications terminals available for use such as whether call quality or call charge takes priority—allows, if a plurality of communications terminals are available for use at the same time in response to a call origination request, the optimal communications terminal to be chosen from call originator/receiver user presence information, busyness and mutual relationship such as job title, and further from selection information such as whether communication quality or charge takes priority, automatically selecting the optimal communications terminal and transferring call without the call originator being aware of the call terminator, providing the optimal transfer service in a situation of a plurality of different types of terminals being available for use and taking full advantage of merits of diversification of communications infrastructure. It is also possible, if, in response to a call transfer request from an external network, a terminal existing in the same external network is selected as a call termination terminal, to notify the phone number of the selected terminal so as to allow direct call origination because of the fact that call transfer results in call charge being charged doubly, thus avoiding double charging and allowing reduction in communications charge. It is also possible to determine a key phone number for individual phone numbers of a plurality of terminals existing in the inhouse network and notify the key number to call transfer request, routed via a data circuit of an external network, so as to allow call origination, transferring call by converting the key phone number received as a result of call origination to the terminal phone number selected by call transfer request and thereby saving outside call numbers. The above and other objects, features, and advantages of the present invention will become more apparent from the following detailed description with reference to the drawings.

BRIEF DESCRIPTION OF THE DRAWINGS

FIGS. 2A to 2C are block diagrams of the functional configurations of a call transfer server, a secure gateway, and user clients in FIG. 1;

FIG. 3 is an explanatory view of user presence information used in the present invention;

FIG. 4 is an explanatory view of terminal information used in the present invention;

FIG. 5 is an explanatory view of call origination event information used in the present invention;

FIG. 6 is an explanatory view of in-room terminal information used in the present invention;

FIG. 7 is an explanatory view of a terminal filter list used in the present invention;

FIG. 8 is an explanatory view of a priority level information list used in the present invention;

FIG. 9 is an explanatory view of a terminal selection rule list used in the present invention;

FIG. 10 is an explanatory view of a call terminal selection sequence of the present invention by the call transfer server;

FIGS. 11A and 11B are flowcharts of a call terminal selection processing of the present invention by the call transfer server;

FIGS. 14A and 14B are explanatory views of a terminal information registration sequence in user clients;

FIGS. 25A and 25B are flowcharts of a call terminal selection processing of the present invention including double charging avoidance in FIG. 15 and outside call number saving in FIG. 21.

DETAILED DESCRIPTION OF THE PREFERRED EMBODIMENTS

Figure 1:
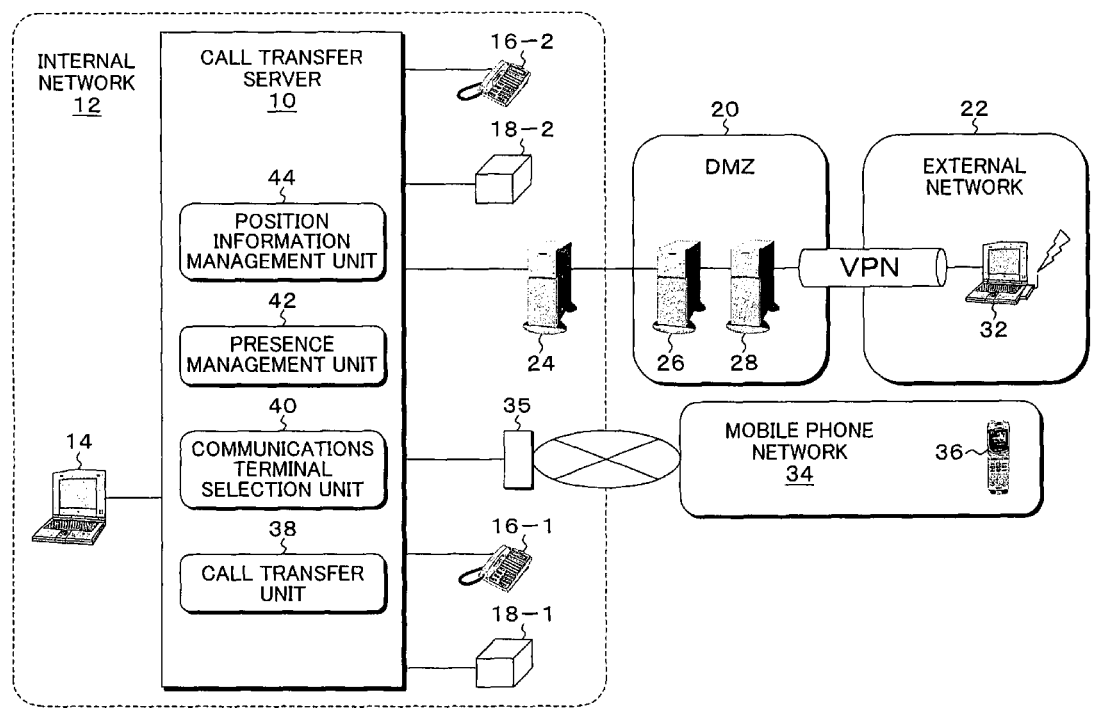
FIG. 1 is a block diagram of a communications system to which call transfer processing of the present invention is applicable.

FIG. 1 is a block diagram of a communications system to which call transfer processing of the present invention is applied. In FIG. 1, there is provided a call transfer server 10 for performing call transfer processing of the present invention in an internal network 12 such as corporate network. An inhouse user client 14, extension phones 16-1 and 16-2 and position information detection devices 18-1 and 18-2 are connected to the call transfer server 10. The call transfer server 10 is connected to an external network 22 via a DMZ (demilitarized zone) 20. In the external network 22, there exists an outside user client 32 that is connected to a VPN server via VPN (Virtual Private Network) as a communications path. A secure gateway server 26 provided in the DMZ 20 and a secure gateway relay server 24 provided in the internal network 12 perform connection control for instant message, presence information and IP phone. In the case of connection from the VoIP phone of the outside client 32 to the VoIP phone of the internal network 12, for instance, connection is established with the secure gateway server 26 located at an Internet relay point, for example, for conversion to MetaIP phone protocol, thus transmitting data through safe connection with the secure gateway relay server 24, the next relay point across the firewall. Data thus sent is reconstructed as VoIP phone protocol at the secure gateway relay server 24, the relay point of the internal network 12, originating call to VoIP phone provided, for example, by the inhouse user client 14 of the internal network 12 and implementing safe VoIP communication via firewall. The call transfer server 10 is connected to a mobile phone network 34, enabling call connection with a mobile phone 36. Relay point between the mobile phone network 34 and the internal network 12 is implemented by a SIP-PSTN gateway server 35. The call transfer server 10 provided in the internal network 12 has capabilities, namely, a call transfer unit 38, a communications terminal selection unit 40, a presence management unit 42 and a position information management unit 44. The communications terminal selection unit 40 provided in the internal network 12 acquires presence information—including call originator's presence information and terminal information about terminals available for use by call terminator—from the presence management unit 42 upon receipt of a call origination request, for example, from the extension phone 16-1, and selects a terminal available for use by call terminator based on the acquired presence information, notifying the call transfer unit 38 of the terminal so that the unit 38 can proceed with call transfer. In this case, if there are a plurality of terminals available for use by call terminator, the communications terminal selection unit 40 selects, based on terminal selection information, in which at least whether communication quality or charge takes priority is defined beforehand by call terminator, a specific terminal from among a plurality of terminal candidates, notifying the call transfer unit 38 of the terminal so that the unit 38 can proceed with call transfer. As for terminal selection information for selection of a specific terminal among a plurality of terminals, terminal filters and priority level information are selectively defined by user to be made available for use in the present invention as will be apparent from later description.

Figure 2A:
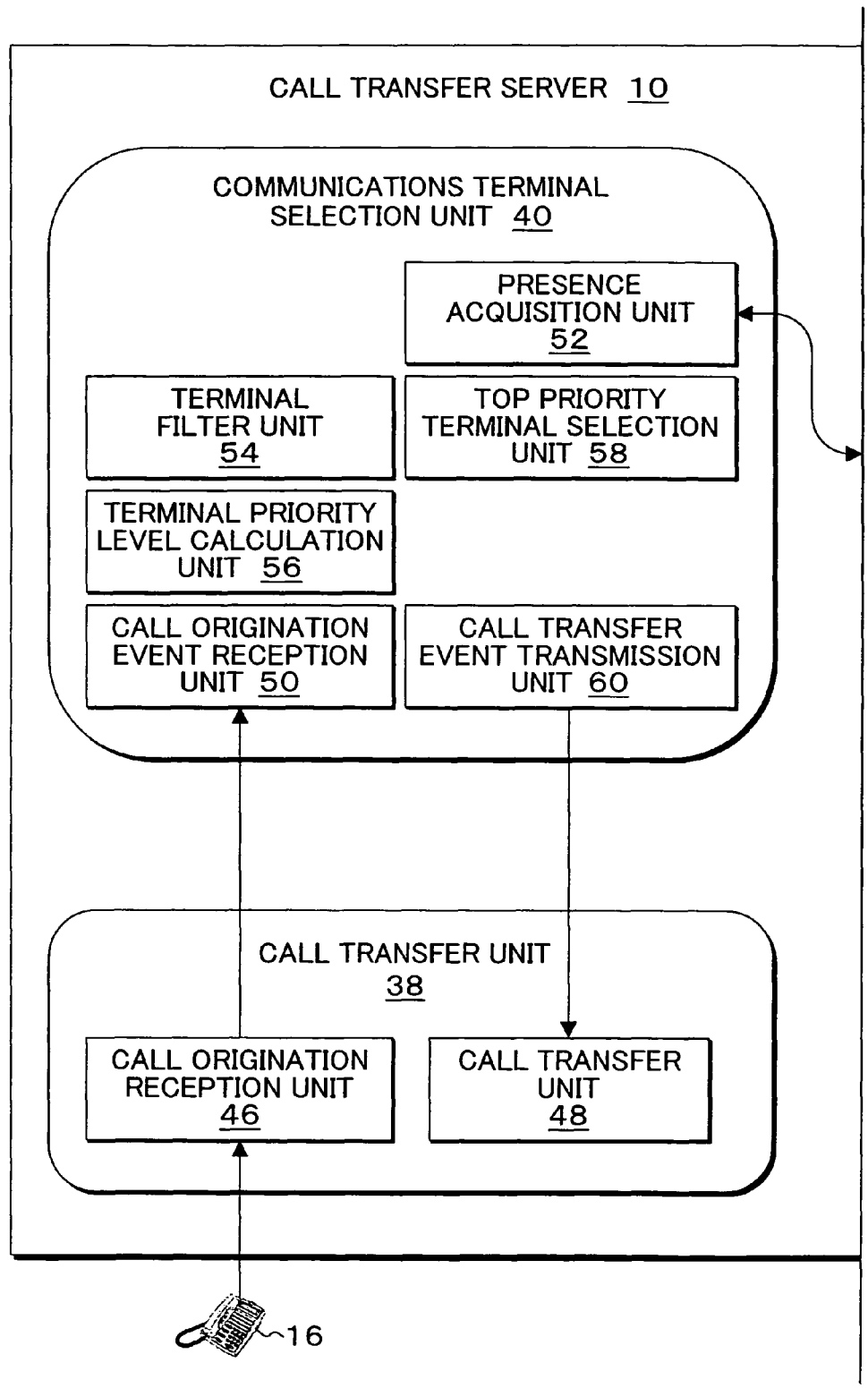
Figure 2B:
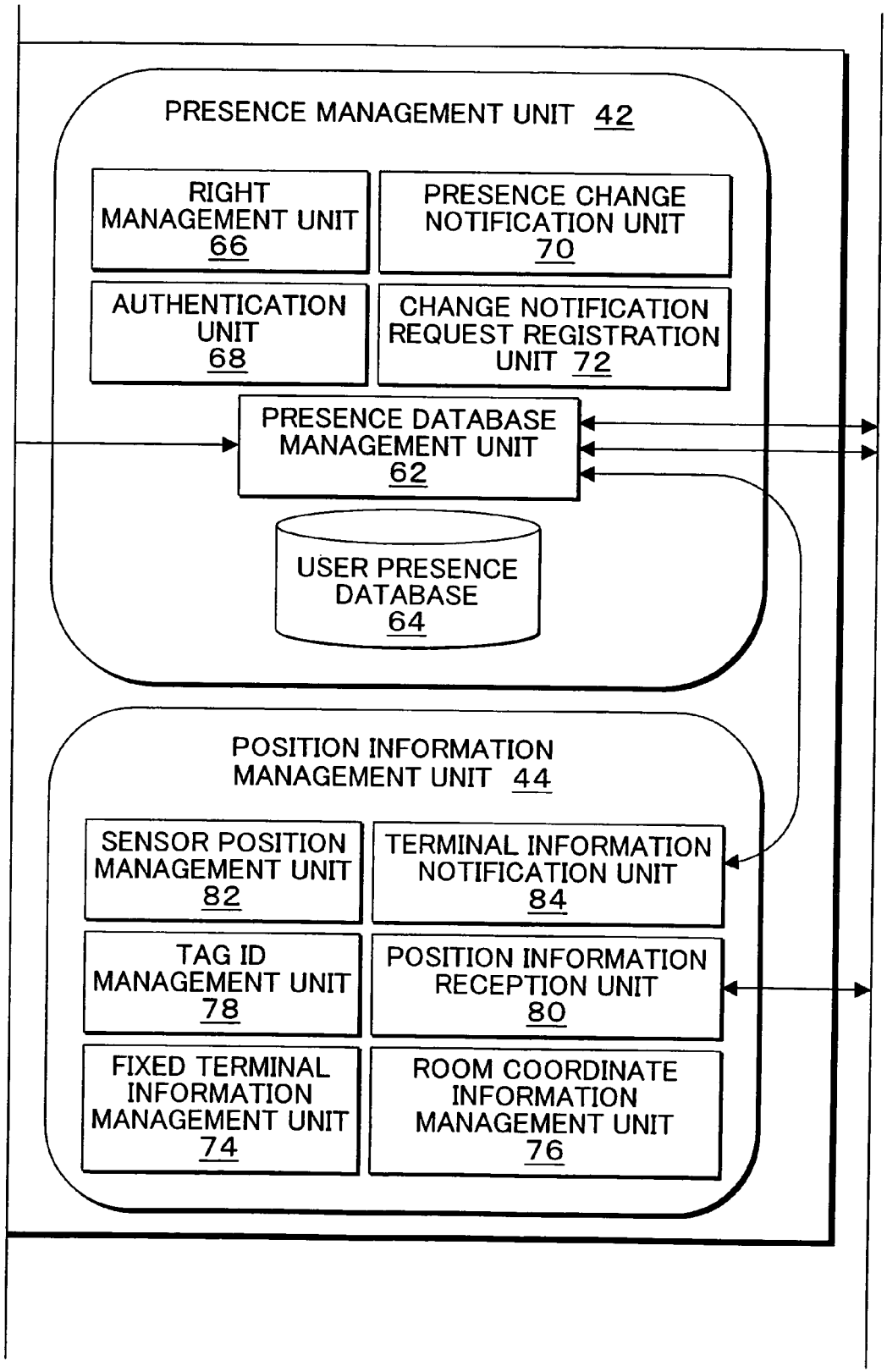

FIGS. 2A and 2B are block diagrams showing the functional configurations of the call transfer server 10, a secure gateway 30, the inhouse user client 14 and the outside client 32 in FIG. 1. In FIGS. 2A to 2C, the call transfer unit 38 of the call transfer server 10 is provided with a call origination reception unit 46 and a call transfer unit 48. The call origination reception unit 46 creates a call origination event in response to a call origination request from a call origination terminal such as the extension phone 16, notifying the call transfer server 10. In response to selection notice from the communications terminal selection unit 40, the call transfer unit 48 transmits call to the destination of call termination—a communications terminal selected from call origination terminal and the extension phone 16. The communications terminal selection unit 40 is provided with a call origination event reception unit 50, a presence acquisition unit 52, a terminal filter unit 54, a terminal priority level calculation unit 56, a top priority terminal selection unit 58 and a call transfer event transmission unit 60. The details of processings performed by the individual units of the communications terminal selection unit 40 will become apparent in later description. The presence management unit 42 is provided with a presence database management unit 62 and a user presence database 64. In the user presence database 64, given information is registered in advance in relation to users using the communications system in FIGS. 2A to 2C. The presence management unit 42 is further provided with an authentication unit 68, a right management unit 66, a presence change notification unit 70 and a change notification request registration unit 72. The position information management unit 44 is provided with a fixed terminal information management unit 74, a room coordinate information management unit 76, a tag ID management unit 78, a position information reception unit 80, a sensor position management unit 82 and a terminal information notification unit 84. In correspondence with the position information management unit 44, the position information detection device 18 is provided, for example, within each of the rooms in the internal network, activating an ID notification unit 85 as a result of information communication from a tag ID 15 for the position information detection device 18 if a user with the tag ID 15 enters the communication-enabled area of the position information detection device 18 and conveying information in the detected tag ID 15 to the position information reception unit 80 of the position information management unit 44.

FIG. 3 is an explanatory view of user presence information 108 registered in the user presence database 64 in FIGS. 2A to 2C. The user presence information 108 contains not only a name 110, a department 112, a work group 114, a related project name 116, a related product name 118, busyness 120, a job title 122, position information 124, a wireless tag ID 126, communications terminal information 128, but also additional profile information such as sex, address, birth date and hobby information. In the communications terminal selection processing of the present invention, conditions for selecting the optimum terminal from among a plurality of terminals available for use by call terminator, and more specifically, terminal filters are defined using the related project name 116, the busyness 120, the job title 122 and so on in the user presence information 108.

FIG. 4 is an explanatory view of terminal information 130 managed by the position information management unit 44 provided in the call transfer server 10. The terminal information 130 is created for each terminal ID. In the terminal information 130, a contact media 132, a status 134, a UID (unit ID) 136, a media profile 138, a phone type 140, a charge 142, a bandwidth 144 and a delay 146 are registered as information. The contact media 132, a tag representing the user contact terminal, indicates one of fixed phone, instant message (im), http and mail as attribute information (first attribute information). The status 134 indicates whether the terminal represented by the contact media 132 is available. The UID 136 is the address of the contact media, with SIP (Session Initiation Protocol) address used for all phone types. Further, detailed types of contact terminal are defined as attribute information (second attribute information). For phone, for example, fixed phone ("fixed"), mobile phone ("pdc"), PHS ("phs") and VoIP software ("voip") are stipulated. The media profile 138 is detailed information on the contact terminal. The phone type 140 indicates whether the phone terminal is interactive or recording. The charge 142, representing the usage cost of the contact terminal, indicates charging type as attribute information and stipulates time charging (¥/min) and data charging (¥/1 Kbyte). The bandwidth 144, a parameter representing call quality, accepts communication bandwidth information (bps) of the contact terminal as input. Further, the delay 146 is also a parameter representing call quality and accepts communication delay information (sec) of the contact terminal as input. In the communications terminal selection processing of the present invention, since a specific terminal is selected from among a plurality of terminal candidates according to whether user gives priority to call quality or charge, values of the charge 142, the bandwidth 144 and the delay 146 are used to calculate priority level for this selection.

FIG. 5 is an explanatory view of call origination event information 148 created at the time of reception of a call origination request by the call origination reception unit 46 of the call transfer server 10, and notified to the communications terminal selection unit 40. In the call origination event information 148 in FIG. 5, there are registered a transfer event ID 150, a call originator terminal ID 152, a transfer monitoring registration ID 154, a current transfer destination number 156, a call origination number 158, a call termination number 160, and further a call priority level 162. Among these, the call priority level 162 is employed as evaluation value for call originator of terminal filters used for the communications terminal selection processing.

FIG. 6 is an explanatory view of in-room terminal information 164 managed by the position information management unit 44 of the call transfer server 10. The in-room terminal information 164 consists of a room item 166, a location area 168 and a contact 170. The room item 166, terminal information in a single room, holds a room name as attribute information. The location area 168, room area information, represents the room location and range and indicates the room shape as attribute information. The contact 170, including contact media format terminal information, represents a user-specific terminal if attribute information "paid" is added and a common terminal if not.

FIG. 7 is an explanatory view of a terminal filter list 172 managed by the terminal filter unit 54 of the communications terminal selection unit 40 provided in the call transfer server 10 in FIGS. 2A to 2C. The terminal filter list 172 stores, for example, three types of terminal filters having different filter contents named FL1, FL2 and FL3 as filter IDs. These terminal filters define rules for comparing, upon receipt of a call origination request, a first evaluation value held by call originator and a second evaluation value held by call terminator and selecting a specific terminal or service based on which is larger or smaller of the two values. The terminals FL1 to FL3 are described more specifically as follows. The terminal filter FL1 selects call terminal if call terminator's busyness is lower than call priority level and selects recorded service in any other cases. The terminal filter FL2 selects call terminal if call terminator's job title is lower than that of call originator and selects recorded service in any other cases. Further, as for the terminal filter FL3, although it selects call terminal if call terminator's busyness is lower than call priority level and selects recorded service in any other cases, the terminal filter FL3 selects call terminal, as an exception, if a specific project name is contained in the call originator's related project name. Appropriate terminal filters may be defined as necessary in addition to the terminal filters FL1, FL2 and FL3 shown in the terminal filter list of FIG. 7, and users select and set up an appropriate terminal filter for each terminal according to the types of communications terminals available to them.

FIG. 8 is an explanatory view of a priority level information list 174 managed by the terminal priority level calculation unit 56 of the communications terminal selection unit 40 provided in the call transfer server 10. The priority level information list 174 consists of list IDs, user-requested conditions and evaluation functions each made up of weight and value. Priority level information in the priority level information list 174 is used to calculate priority level for each of the terminal candidates, for example, if call terminal is selected using any one of the terminal filters in the terminal filter list 172 shown in FIG. 7 and if there exist a plurality of candidates for call terminal, and specified priority level information in the priority level information list 174 is employed for priority level calculation. A calculation formula for calculating a priority level P for terminals of the present invention is given, for example, by the following formula: Priority level P={log (bandwidth)×W1}−{(delay)×W2}−{time charging (¥/min)× W3}−[data charging (¥/1 Kbyte)×W4]+V (1) In formula (1), values for bandwidth, delay, time charging and data charging can be obtained from the terminal information 130 in FIG. 4. Each of these values obtained from the terminal information 130 is weighted by multiplication by weights W1, W2, W3 and W4. Further, a priority level value V at the end is set to an arbitrary value by users as necessary to adjust the priority level P. That is, a positive priority level value is set when a user wishes to use a specific terminal to the extent possible, whereas a negative priority level value is set if the user does not wish to use any specific terminal. It is apparent from the calculation formula of the priority level P that "bandwidth", the first term on the right side, is a parameter for giving priority to call quality. As a result, the larger the priority level P, the higher the call quality and the less expensive the communications charge. Conversely, the lower the priority P, the poorer the call quality and the more expensive the communications charge. Priority level information PD1 in the priority level information list 174 of FIG. 8 has a user-requested condition stating, "Priority given to terminal with high call quality and inexpensive call charge." In this case, the weights W1, W2, W3 and W4, and the priority level value are set respectively to 10, 0, 5, 10 and 10. According to such a setting of an evaluation function, it is possible to preferentially select a terminal with higher call quality and less expensive communications charge as the priority level increases using the formula (1). Priority level information PD2 has a user-requested condition stating, "Priority given to call quality if call terminator is lower than call originator in job title." Since call quality takes priority, the weight W1 for "bandwidth" and the weight W2 for "delay", both related to call quality, are set respectively to W1=10 and W2=100 in the evaluation function. Since call charge is not taken into account, both W3 and W4 are set to 0, further with the priority level value V set to 0. According to the evaluation function using the priority level information PD2, the higher the priority level, the more priority is given to call quality. Priority level information PD3 has a user-requested condition stating, "Priority given to call charge if call terminator is equal to or higher than call originator in job title." Since call charge takes priority, the weight W1 for "bandwidth" and the weight W2 for "delay", both related to call quality, and the priority level value are set respectively to 0, whereas the weights W3 and W4 for time charging and data charging, evaluation values for giving priority to call charge, are set respectively to 10. It is to be noted that since the priority level value P calculated for the priority level information PD3 is negative, the terminal with the highest priority level is selected based on the absolute value of the priority level value P. Priority level information PD4 has a user-requested condition stating, "Use of VoIP phone desired." In this case, the weights W1 to W3 for call quality and time charging are all set to 0, whereas the weight W4 for data charging is set to −10 and the priority level value V for calculating the priority level P for VoIP phone is set to 100, a large value that ensures that VoIP phone is ranked above all other terminals in calculation results. Priority level information PD5 also has a user-requested condition stating, "Use of TV-equipped phone desired." In this case, the weights W1 to W4 for call quality and call charge are all set to 0, whereas the priority level value V for calculating the priority level for TV-equipped phone is set to 100, a large value.

FIG. 9 is an explanatory view of a terminal selection rule list 176 used in communications terminal selection processing performed by the terminal filter unit 54, the terminal priority level calculation unit 56 and the top priority terminal selection unit 58 of the communications terminal selection unit 40 provided in the call transfer server 10 of FIGS. 2A to 2C. The terminal selection rule list 176 consists of rule IDs 178, rule descriptions 180, terminal filters 182 and priority level information 184, defining combinations of the terminal filter 182 and the priority level information 184 that satisfy the rule descriptions 180. It is possible, based on the terminal filter 182 and the priority level information thus defined, to select, from among a plurality of terminal candidates, a specific terminal that satisfies the rule description. Here, a description will be given below of rules R1 to R5 in the terminal selection rule list 176 of FIG. 9.

(Rule R1)

Selection according to busyness. Call terminal is selected by the terminal filter FL1 if call terminator "busyness" is lower than "call priority level" in call origination event information, with recorded service selected in any other cases. The priority level information PD1 gives priority to candidate with high call quality and low call charge.

(Rule R2)

Selection according to job title. Call terminal is selected by the terminal filter FL1 if call terminator "busyness" is lower than "call priority level" in call origination event, and call terminal is equally selected by the terminal filter F2 if call terminator is lower than call originator in job title, with recorded service selected in any other cases. When call terminal is selected, call quality takes priority if call terminator is lower than call originator in job title because of the priority level information PD2, with priority given to candidate with inexpensive call charge in any other cases because of the priority level information PD3.

(Rule R3)

Selection according to project. Call terminal is selected by the terminal filter FL3 if call terminator "busyness" is lower than "call priority level" in call origination event, with recorded service selected in any other cases. As an exception, call terminal is selected if a specific project name is contained in the call originator's "related project name" information. If there are a plurality of call terminals, priority is given to call quality because of the priority level information PD2. The rule R3 denotes a case in which the user wishes to receive calls related to important projects even if the user is in the middle of a meeting.

(Rule 4)

Selection according to individual name/user ID. Call terminal is selected by the terminal filter FL1 if call terminator "busyness" is lower than "call priority level" in call origination event information, with recorded service selected in any other cases. If there are a plurality of communications terminals, priority is given to terminal with inexpensive call charge by the priority level information PD4. Additionally, a priority level value V2 for VoIP phone is set to 100 if call originator has a specific user ID. The rule R4 denotes a case in which call is terminated as a call soliciting multi-party phone conference from a phone conferencing system and a case in which the user wishes to receive a call with VoIP phone of the own personal computer to the extent possible in order to share data.

(Rule 5)

Selection according to call capability of call originator. The priority level value V is set to 100, thus allowing priority level information PD5 to assign a high priority level to the terminal with TV phone capability among call terminals of call terminator if call originator uses a phone equipped with TV phone capability and if a plurality of call terminals are selected by the terminal filter FL1.

Thus, in the communications terminal selection processing of the present invention, it is possible to obtain communications terminal selection results tailored to user needs if one or more terminal filters and one or more pieces of priority level information are combined through user setting of a terminal selection rule. In this case, if a plurality of terminal filters are set by a single user, the sum of sets of terminals made available by individual terminal filters is available terminal candidates. If a plurality of pieces of priority level information is set by a single user, the total of evaluation values of all pieces of priority level information is the priority level of individual terminals. Further, if results of the automatic selection according to the present invention are not satisfactory, call originator can add new rules or change parameters serving as weights and value upward or downward, thus making it possible to obtain terminal selection results that suit the preference of call terminator. As terminal selection rules, a template is available in advance, thus allowing addition of favorite terminal selection rules by addition through parameter settings. In addition to the above, specific user's terminal selection rule may be copied for use by giving an instruction, such as "Copy Mr. A's filter and priority level." Further, if a terminal selection rule is changed, it is possible to perform simulation using call selection capability and confirm, for example, "Priority setting in the case of customer call while on business trip" obtained as simulation results, thus adjusting terminal filters and/or priority level information in the terminal selection rule list.

FIG. 10 is an explanatory view of a call terminal selection sequence of the present invention by the call transfer server in FIGS. 2A to 2C. In FIG. 10, if a call is originated from a call originator terminal 11, the call transfer unit 38 handles a call origination acceptance 186 and issues a call origination event 188, created based thereon, to the communications terminal selection unit 40. The communications terminal selection unit 40 makes an information inquiry 190 to the presence management unit 42, acquiring a terminal information list 192—a list combining call originator and terminator presence information and call origination event information—from the presence management unit 42. Based on the terminal information list 192, the communications terminal selection unit 40 selects available call terminal or terminals using user-specified rules in the terminal selection rule list 176 of FIG. 9, calculates a priority level for each call terminal if there are a plurality of available call terminals, selects a terminal with the highest calculated priority level as the transfer destination terminal and notifies the terminal to the call transfer unit 38 as a call transfer event 194. In response to the call transfer event 194 from the communications terminal selection unit 40, the call transfer unit 38 performs a transfer 196 for notifying the transfer destination terminal to the call originator terminal 11, thus resulting in a call termination 198 on the extension phone 16—the transfer destination terminal selected by the call originator terminal 11.

Figure 11B:
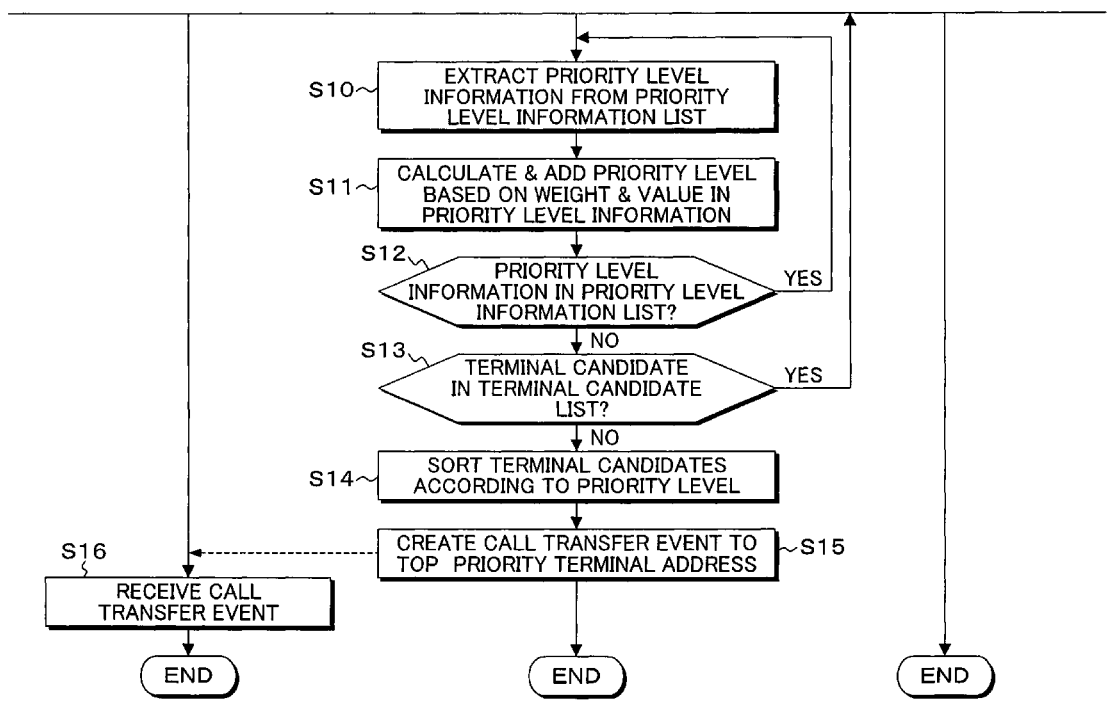

FIGS. 11A and 11B are flowcharts of a call terminal selection processing of the present invention by the call transfer server 10. In FIG. 11A and FIG. 11B, the call transfer unit 38 generates, upon reception of a call origination request, a call origination event and transmits the request to the communications terminal selection unit 40 at Step S1. Upon reception of the call origination event, the communications terminal selection unit 40 makes a presence information inquiry to the presence management unit 42 at Step S2.

In response to the inquiry, the presence management unit 42 returns presence information as response at Step S3. This allows the communications terminal selection unit 40 to receive and obtain presence information at Step S4. Next at Step S5, the communications terminal selection unit 40 extracts each of the terminal information list, terminal filter list and priority level information list using the call originator's user ID, and selects a filter from the terminal filter list at Step S6. Then, the communications terminal selection unit 40 registers a terminal matching with the selected filter at Step S7. At Step S8, the communications terminal selection unit 40 verifies whether there are any remaining filters in the terminal filter list, and, if so, returns to Step S6 to repeat similar processings. When there are no more remaining filters in the terminal filter list at Step S8, the communications terminal selection unit 40 proceeds to Step S9 where the unit extracts one candidate from the terminal candidate list, extracts priority level information from the priority level information list at Step S10, and calculates a priority level for addition based on the weights and value in the priority level information at Step S11. Further at Step S12, the communications terminal selection unit 40 verifies whether there is next priority level information in the priority level information list, and, if so, returns to Step S10 to repeat similar processings. When there is no more priority level information in the priority level information list, the communications terminal selection unit 40 proceeds to Step S13 where the unit verifies whether there are any terminal candidates in the terminal candidate list, and, if so, returns to Step S9 again where the unit extracts a next terminal candidate and similarly calculates a priority level. When there are no more terminal candidates at Step S13, the communications terminal selection unit 40 proceeds to Step S14 where the unit sorts terminal candidates according to priority level, and then at Step S15, the unit creates a call transfer event to the address of the top priority terminal and delivers the event to the call transfer unit 38. The call transfer unit 38 receives the event and handles call termination on the selected communications terminal at Step S16. It is to be noted that if priority is given to call charge, the calculated values for priority level are all negative in the sorting of terminal candidates according to priority level at Step S14. Therefore, terminal candidates are sorted according to priority level in absolute value, thus selecting the terminal with the highest priority level.

Figure 12:
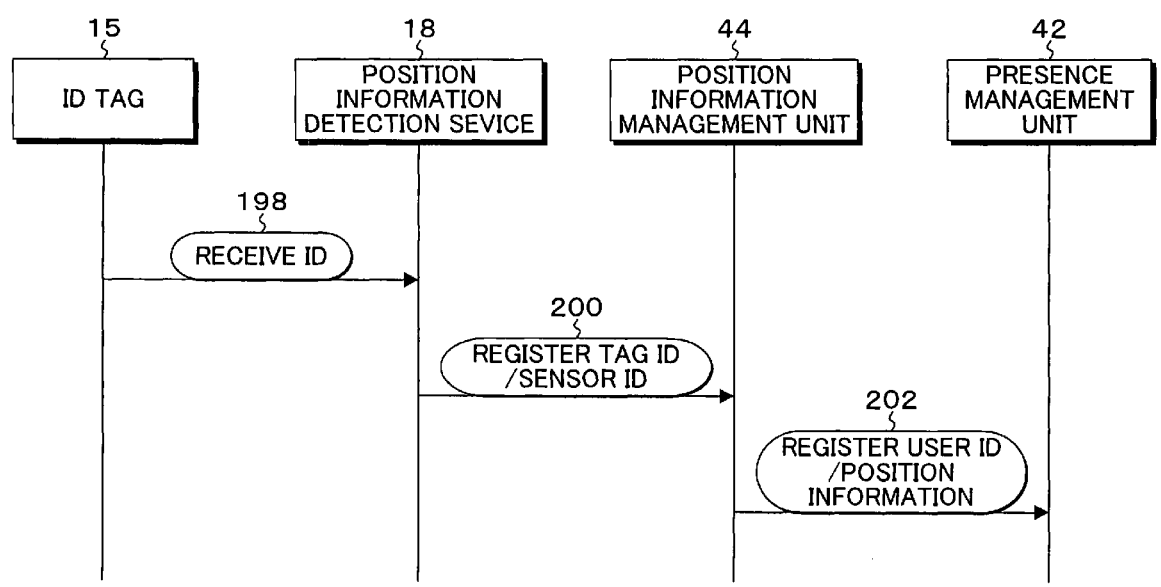
FIG. 12 is an explanatory view of a terminal information registration sequence by the call transfer server.

FIG. 12 is an explanatory view of a terminal information registration sequence in the call transfer server 10 of FIGS. 2A to 2C. In FIG. 12, an ID reception 198 takes place if the user-owned ID tag 15 enters the communication-enabled area of the position information detection device 18, causing the device 18 to perform a tag ID/sensor ID registration 200 in the position information management unit 44. The position information management unit 44 acquires a corresponding user from the tag ID 15 and corresponding position from the sensor ID, searching for user coordinates having the tag ID. In this case, if the same ID tag 15 is detected by the plurality of position information detection devices 18, the position information management unit 44 calculates the center of gravity point of the plurality of position information detection devices 18 that have detected the tag, thus using the point as the coordinates corresponding with the user. The position information management unit 44 acquires the room where the ID tag 15 currently exists from room information registered using calculated coordinate information. Then, the position information management unit 44 performs a user ID/position information registration 202 in the presence management unit 42. In response to the registration, the presence management unit 42 adds position information to the presence information of the user ID. In the presence of terminal or common terminal information for the user ID added to the detected room, the presence management unit 42 also adds such terminal information.

Figure 13A:
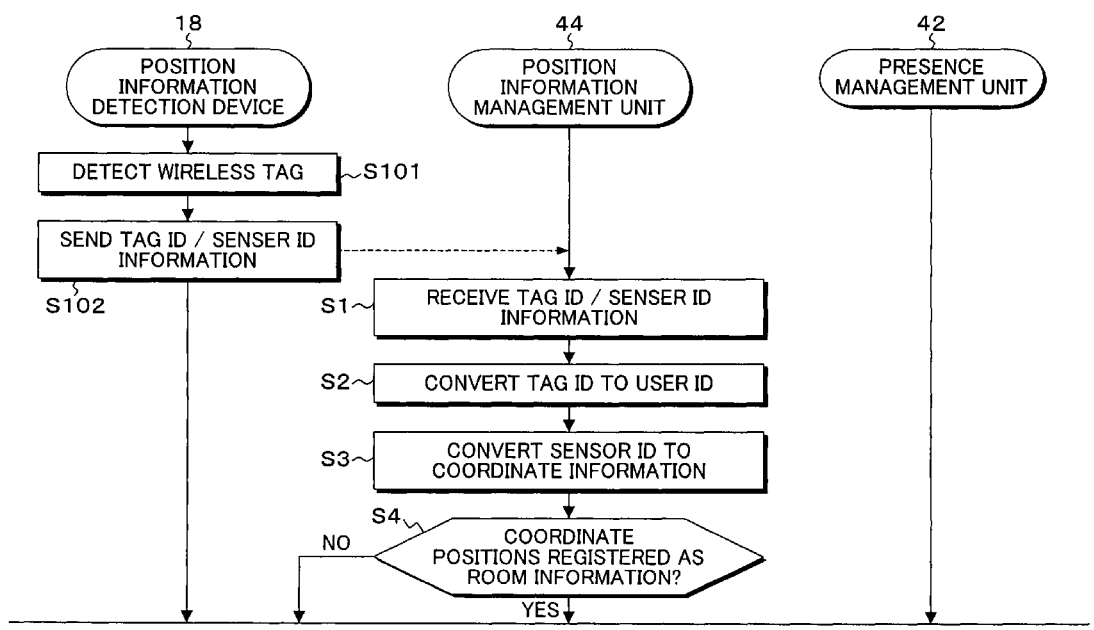
FIGS. 13A and 13B are flowcharts of a terminal information registration processing by the call transfer server.
Figure 13B:
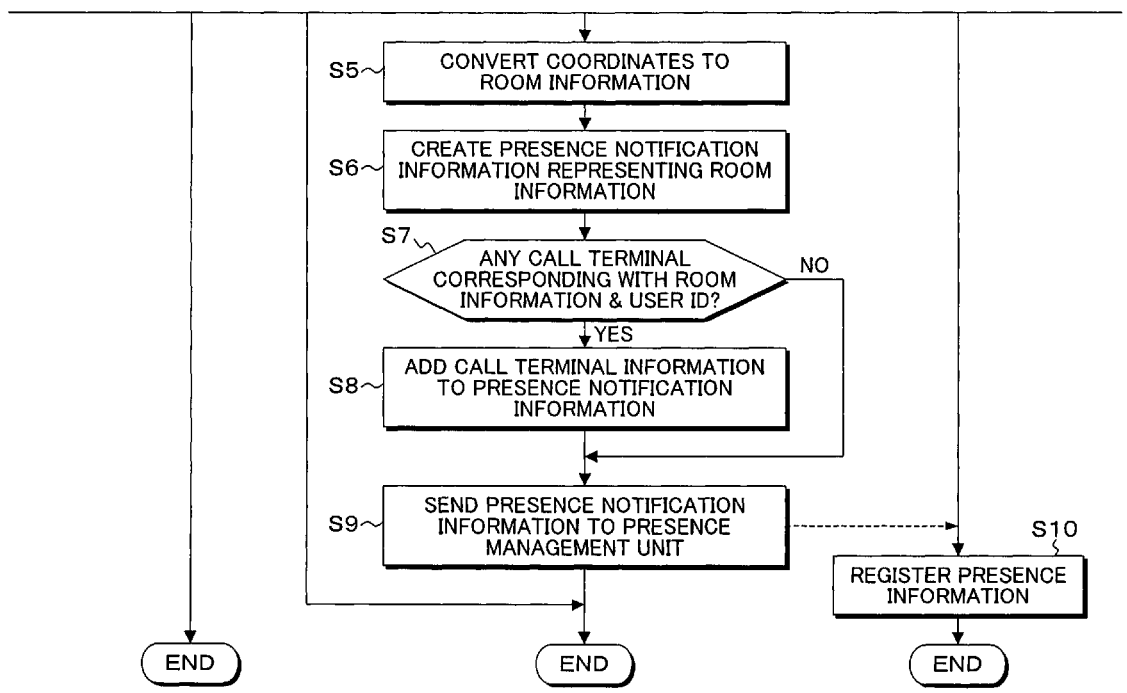

FIGS. 13A and 13B are flowcharts of a terminal information registration processing in the call transfer server 10 of FIGS. 2A to 2C. In FIG. 13A and FIG. 13B, when the position information detection device 18 detects the wireless tag at Step S101, the device 18 transmits the tag ID and sensor ID to the position information management unit 44 at Step S102. In response to the transmission, the position information management unit 44 receives the tag ID and sensor ID information at Step S1 and converts the tag ID to a user ID at Step S2. Then, at Step S3, the position information management unit 44 converts the sensor ID to coordinate information. The position information management unit 44 verifies at Step S4 whether coordinate information is registered as room Information, and, if so, converts the coordinates to room information at Step S5, and then creates presence notification information representing room information at Step S6. Next at Step S7, the position information management unit 44 verifies whether there are any call terminals corresponding with the room information and the user ID, and, if so, adds call terminal information to the presence notification information at Step S8. If there are no call terminals, the position information management unit 44 skips Step S8. Next at Step S9, the position information management unit 44 transmits the presence notification information to the presence management unit 42. In response to the transmission, the presence management unit 42 registers the received presence information in the user presence database.

FIGS. 14A and 14B are explanatory views of a terminal information registration sequence by the user clients 32 of FIGS. 2A to 2C in the call transfer server 10. In FIGS. 14A and 14B, if the user client 32 enters the communication-enabled area of a Wireless LAN 204, an access point discovery 208 is notified to an OS 206, resulting in the OS 206 establishing a wireless LAN connection 210 with the wireless LAN access point. At the completion of the wireless LAN connection 210, the OS 206 makes a LAN connection completion notification 212 to the device monitoring unit 102. The device monitoring unit 102 notifies a VPN connection start 214 to a VPN client 104, automatically initiating encryption notification by VPN to the network. When the network, encrypted by the VPN client 104, is built, a VPN connection completion 216 is notified to the device monitoring unit 102. The device monitoring unit 102 notifies the user ID and LAN information to a presence notification unit (presence management client) 100 as an information registration 218. The presence notification unit 100 notifies the user ID and LAN information to the presence management unit 42 of the call transfer server 10 as an information registration 220 and at the same time makes an IP address notification 222 to a VoIP client 106. The VoIP client 106 registers an SIP address, IP address and port in the call transfer unit 38 of the call transfer server 10 as a registration 224, thus acquiring the SIP address as a VoIP phone number. The VoIP client 106 creates call terminal information by adding communications quality and host information from the LAN information to the VoIP phone number as the SIP address and registers the call terminal information in the presence notification unit 100 as an information registration 226. The presence notification unit 100 notifies the same call terminal information as that registered in the presence management unit 42 of the call transfer server 10, thus registering the information.

Figure 15:
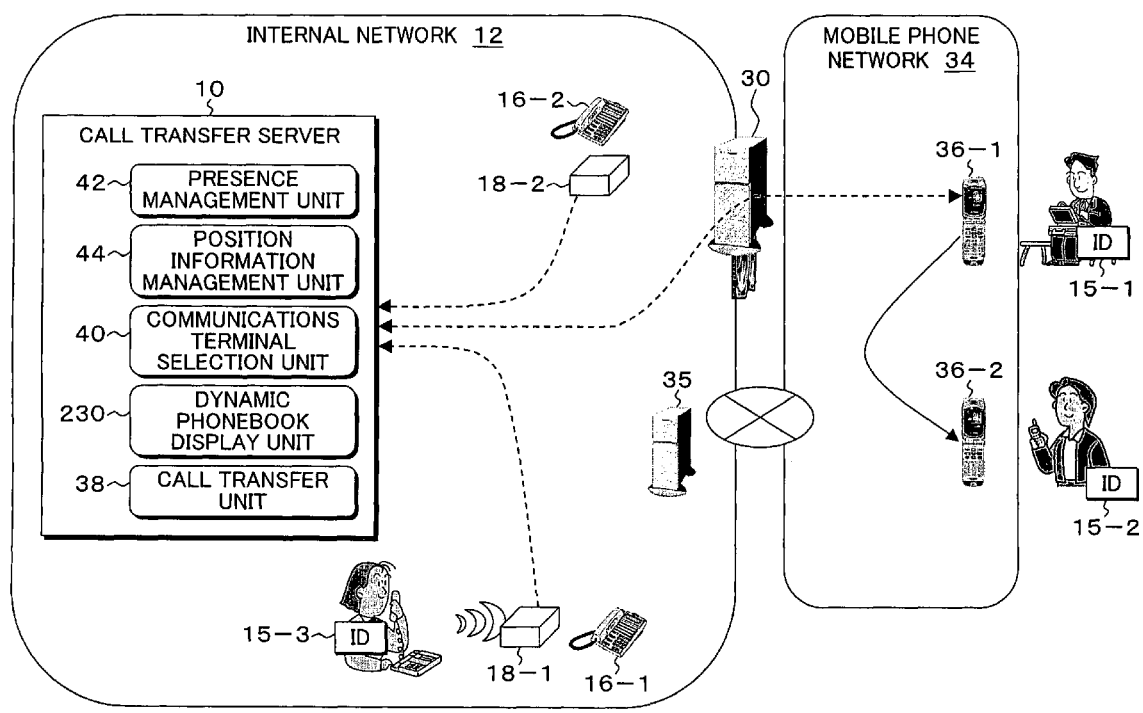
FIG. 15 is an explanatory view of a communications system of the present invention for avoiding double charging by referencing a mobile phone Web page.

FIG. 15 is an explanatory view of a communications system of the present invention for avoiding double charging by referencing a mobile phone Web page. In FIG. 15, the internal network 12 such as corporate network is provided with the call transfer server 10 that in turn is provided with the call transfer unit 38, the communications terminal selection unit 40, the presence management unit 42 and the position information management unit 44. These capabilities are basically the same as those in the embodiment described in FIGS. 2A to 2C. In addition, the present embodiment is provided with a dynamic phonebook display unit 230. The dynamic phonebook display unit 230 handles processings for avoiding double charging, for example, if the communications terminal selection unit 40 selects, in response to a call origination request from a mobile phone 36-1 in the mobile phone network 34, a mobile phone 36-2, that is also an external mobile phone, as the call originator's communications terminal.

Figure 16:
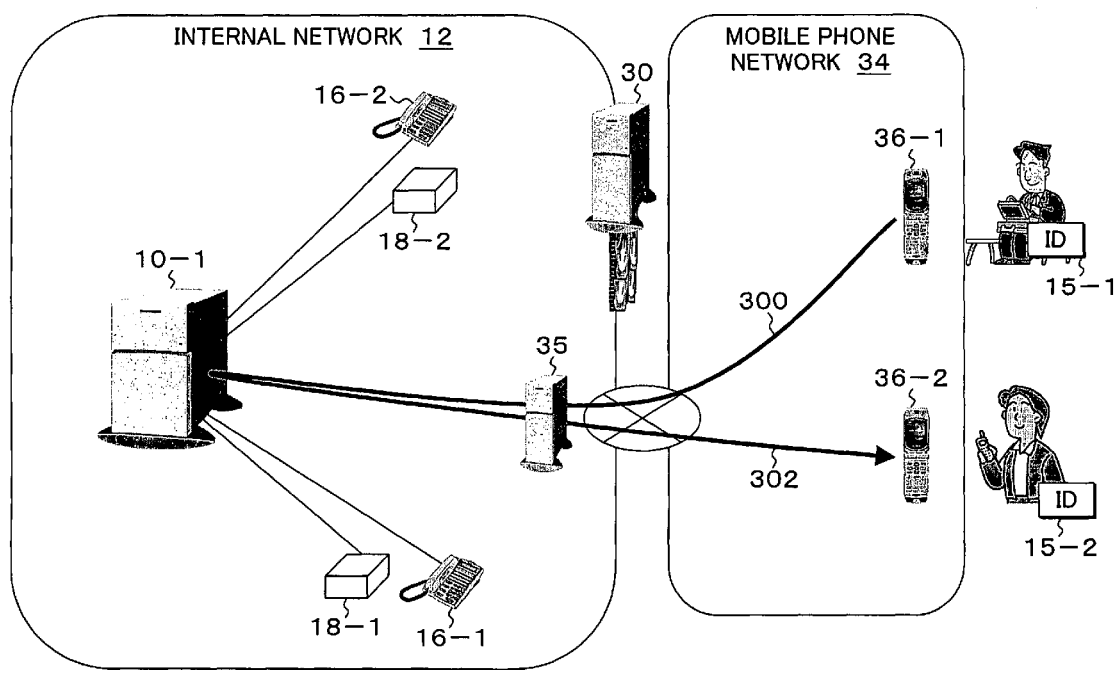
FIG. 16 is an explanatory view of double charging when call transfer of the present invention is not applied.

FIG. 16 is an explanatory view of double charging taking place when a call transfer server 10-1, not equipped with the capability of the dynamic phonebook display unit 230, transfers a call by selecting the mobile phone 36-2 as the communications terminal in response to a call origination request from the mobile phone 36-1. When a call origination request from the mobile phone 36-1 is received by the call transfer server 10-1 via the SIP-PSTN gateway server 35, a relay point of the mobile phone network 34, charging occurs at this communications path 300. Then, when call termination occurs as the call transfer server 10-2 selects the mobile phone 36-2 as the call terminator, and a communications path 302 is established from the internal network 12 to the mobile phone network 34, another charging occurs for the communications path 302. Thus, double charging occurs if the call transfer server 10 selects, in response to a call origination request from an external network such as the mobile phone network 34, a communications terminal that is similarly in an external network, resulting in mounting communications cost. In the embodiment of FIG. 15, in contrast, a phonebook page on the http server is browsed that is provided as the capability of the dynamic phonebook display unit 230 of the call transfer server 10 by using the Web browsing capability of the mobile phone 36-1 and specifying a specific URL.

Figure 17:
FIG. 17 is an example of a browsing page screen returned from an http server in response to a phonebook page browsing request in FIG. 15.
Figure 18:
FIG. 18 is an explanatory view of a confirmation screen notified to a call originator's terminal from a communications terminal selection unit.

FIG. 17 shows an example of a phonebook page 260, provided by the dynamic phonebook display unit 230, that shows a list of staffers as communication parties, with each staffer name serving as a clickable link. For this reason, when a staffer name in the phonebook page is clicked as a called party, the call transfer unit 38 creates call origination event information as with the embodiment of FIG. 1, resulting in the mobile phone 36-2, for example, being selected on the communications terminal in the call origination destination. When the mobile phone 36-2 is selected, corresponding call transfer event information is created and given to the call transfer unit 38, converting the SIP address in the call transfer event to a phone number to which a call can be originated from the mobile phone 36-1. Then, a confirmation screen shown in FIG. 18 is created that includes the phone number of the mobile phone 36-2 as a link, transferring the screen to the mobile phone 36-1 as the call originator and establishing a link. For this reason, the user of the mobile phone 36-1 clicks the "Yes" link in a confirmation screen 262 of FIG. 18, thus originating a call to the mobile phone 36-2 set up by the link and directly establishing a communications path 231. As a result, there is only one communications path in the mobile phone terminal 34; the path from the mobile phone 36-1 to the mobile phone 36-2, resulting in formation of two communications paths as shown in FIG. 16 and thereby avoiding double charging.

Figure 19A:
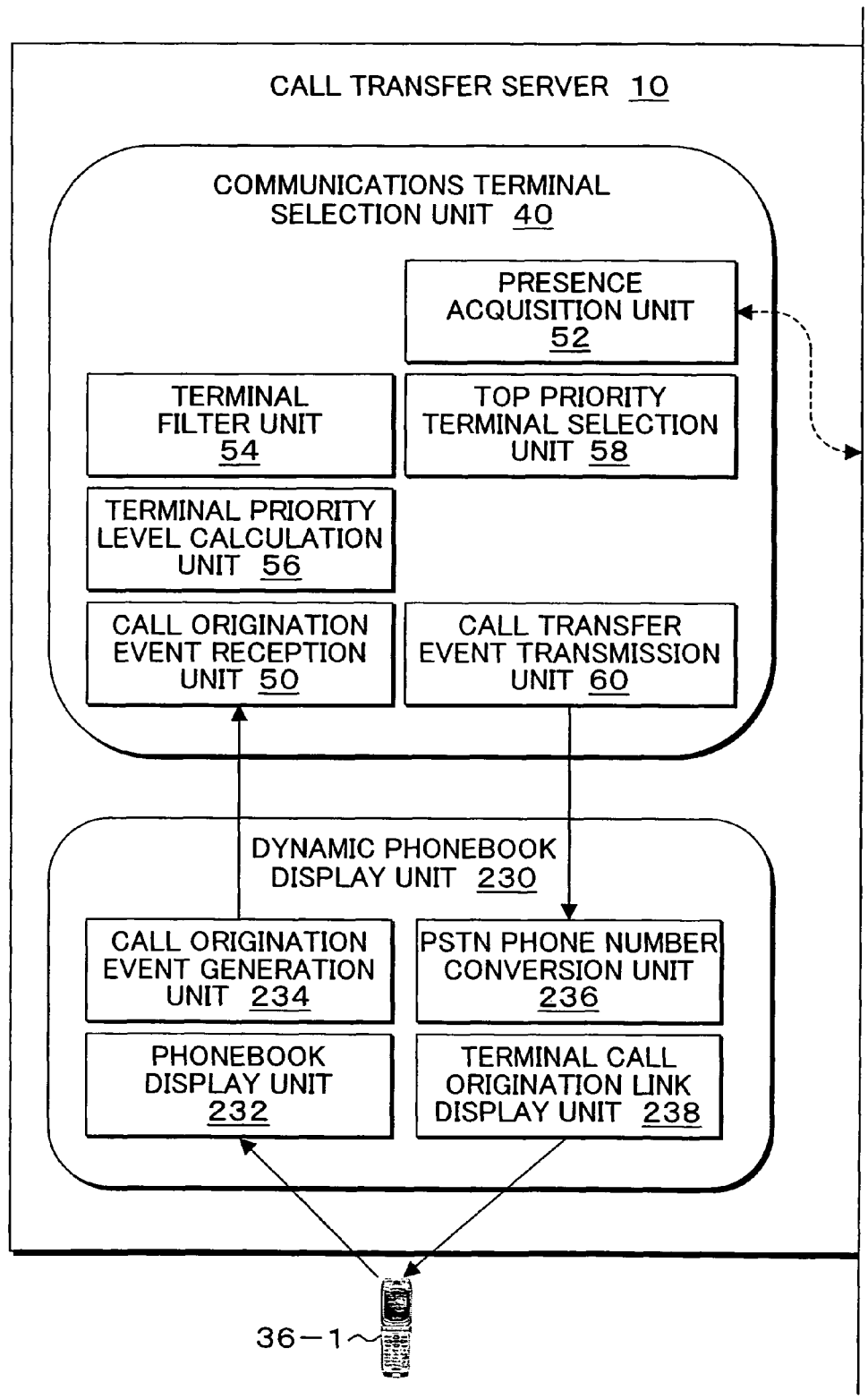
FIGS. 19A to 19C are block diagrams of the functional configurations of the call transfer server, secure gateway, and user clients in FIG. 15.
Figure 19B:
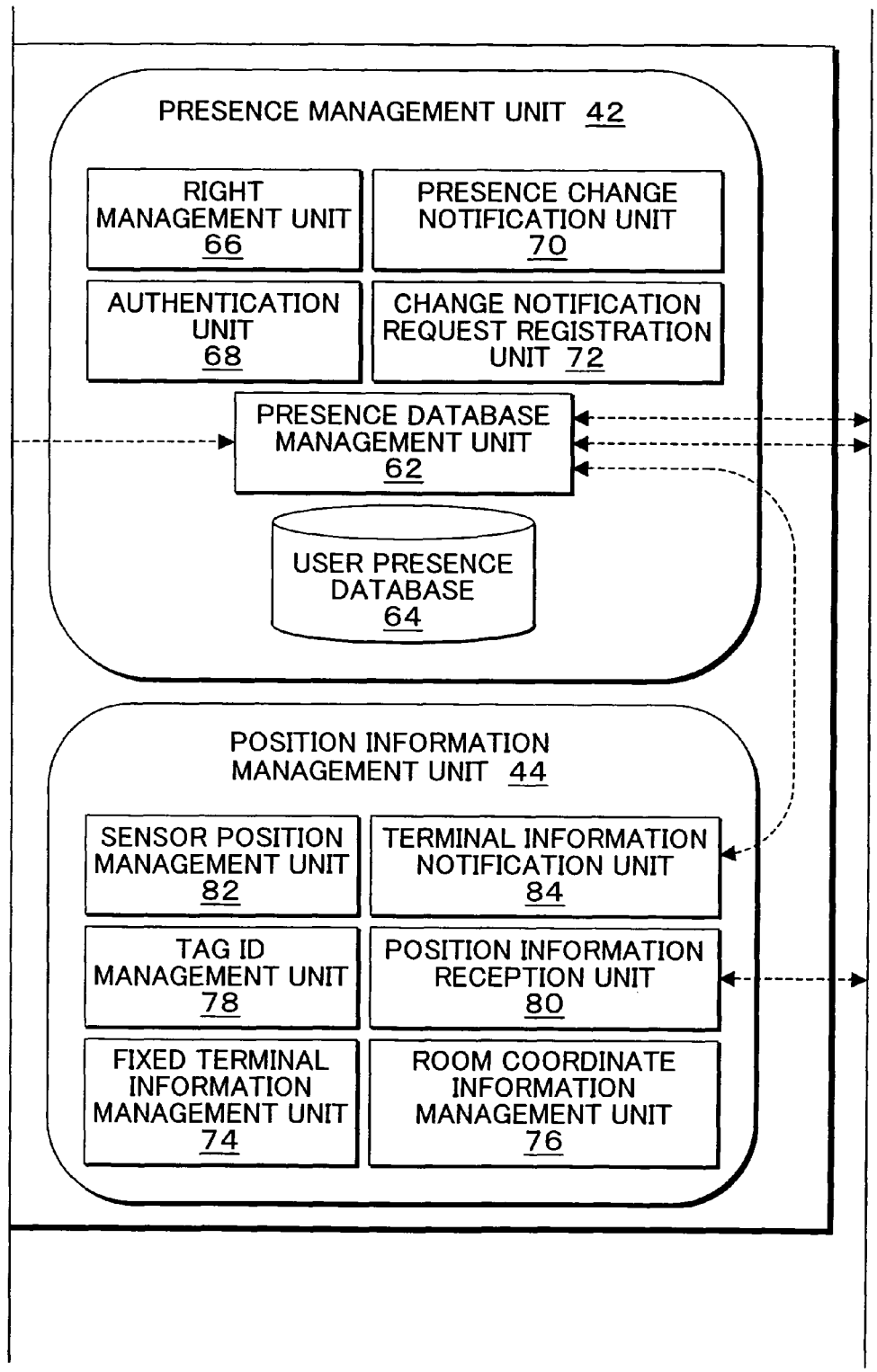
Figure 19C:
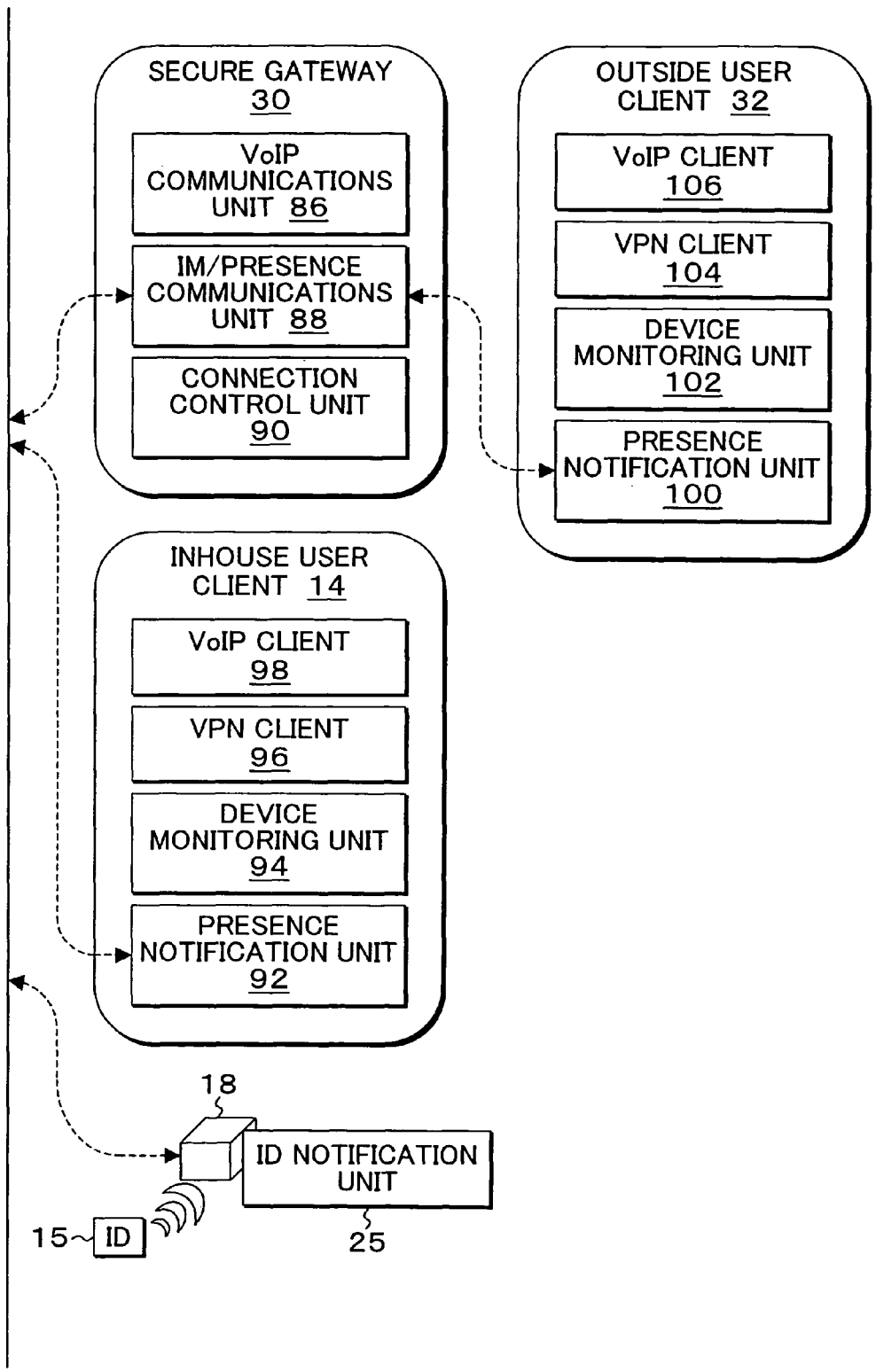

FIGS. 19A to 19C are block diagrams showing the functional configuration of the call transfer server 10 equipped with the capability of avoiding double charging, together with the secure gateway 30, the inhouse user client 14 and the outside user client 32. In FIGS. 19A to 19C, the dynamic phonebook display unit 230 newly provided in the call transfer server 10 is provided with a phonebook display unit 232, a call origination event generation unit 234, a PSTN phone number conversion unit 236 and a terminal call origination link display unit 238. The configuration other than the above is basically the same as that in the embodiment of FIGS. 2A to 2C.

Figure 20:
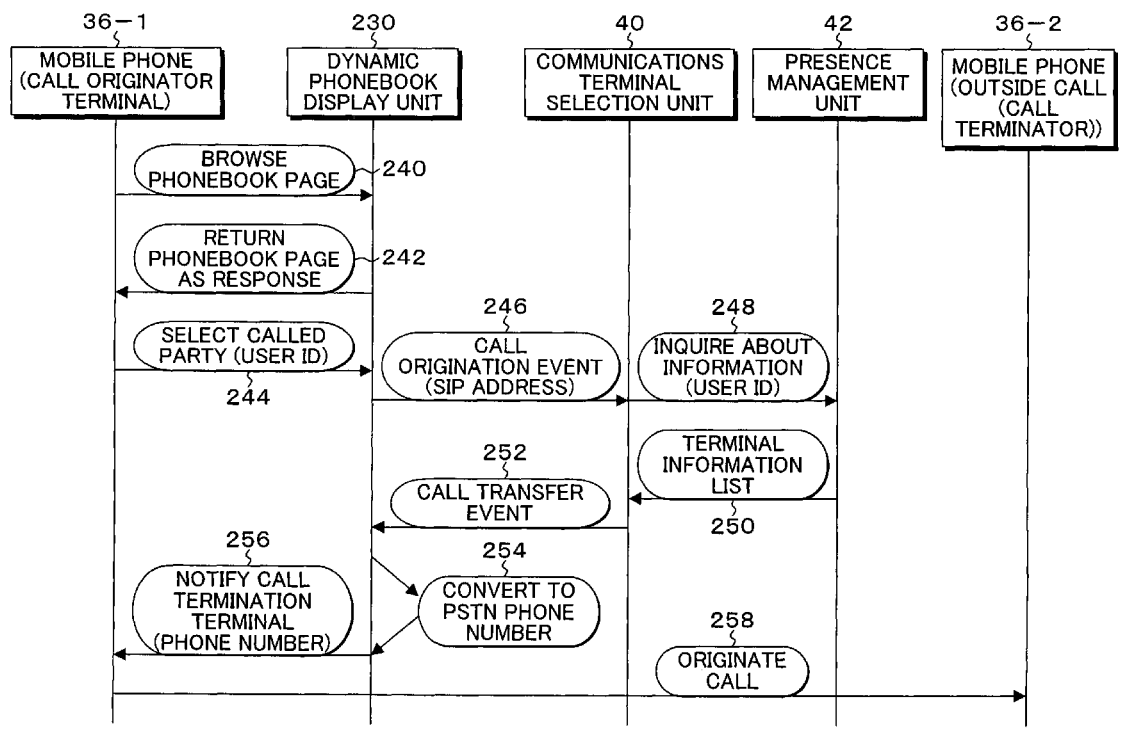
FIG. 20 is an explanatory view of a call terminal selection sequence of the present invention for avoiding double charging in FIG. 15.

FIG. 20 is an explanatory view of a call terminal selection sequence of the present invention for avoiding double charging. In FIG. 20, when the mobile phone 36-1 makes a request for phonebook page browsing 240 to the dynamic phonebook display unit 230 as a call originator transfer, the dynamic phonebook display unit 230 performs a phonebook page return 242 as shown in FIG. 17. In response, the mobile phone 36-1 receives the user ID through a called party selection 244 from among the approved staffer list on the phonebook page, creating a call origination event 246 including SIP address and notifying the event to the communications terminal selection unit 40. The communications terminal selection unit 40 makes an information inquiry 248 to the presence management unit 42 for acquisition of a terminal information list 250, selecting the mobile phone 36-2 as communications terminal based on the transmitted terminal selection and event information specified by the user of the mobile phone 36-2 as described earlier and establishing a call transfer event 252 in the dynamic phonebook display unit 230. In response, the dynamic phonebook display unit 230 converts the SIP address to a PSTN phone number first, and then creates a confirmation screen as shown in FIG. 18 and makes a call termination terminal notification 256 to the mobile phone 36-1 as the call origination terminal, thus establishing a communications circuit from the mobile phone 36-1 to the mobile phone 36-2 through a call origination 258 resulting from clicking of "Yes" on the confirmation screen.

Figure 21:
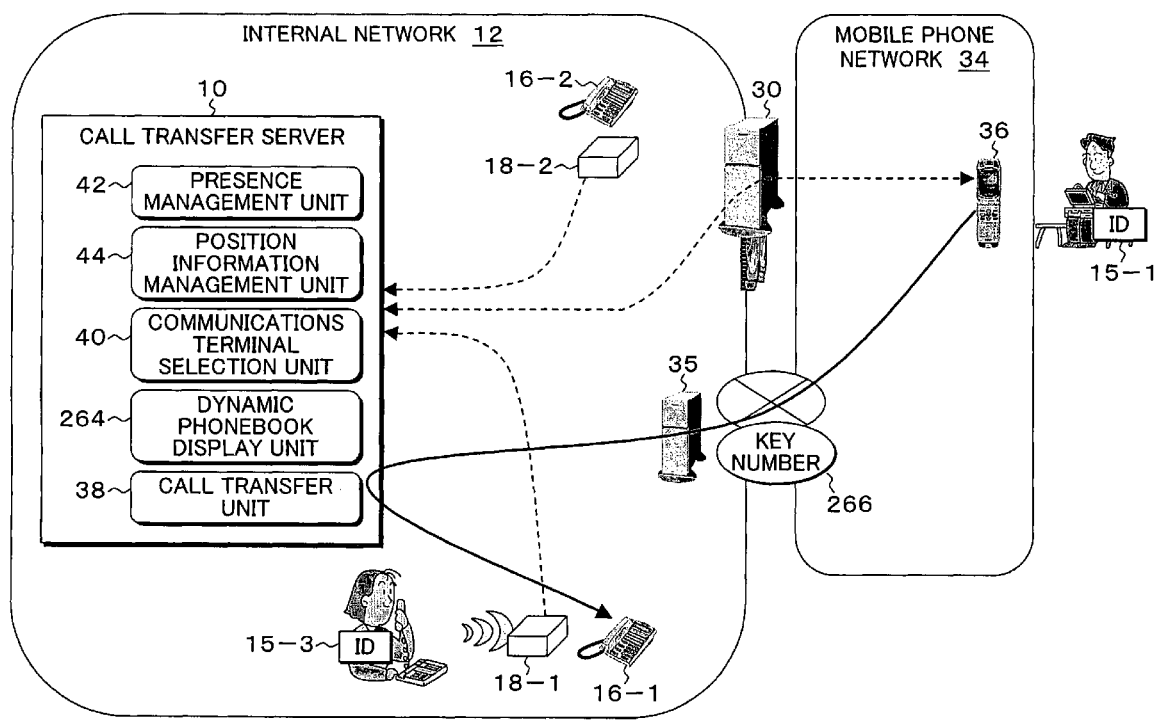
FIG. 21 is an explanatory view of a communications system of the present invention for saving outside call numbers.

FIG. 21 is an explanatory view of a communications system of the present invention for saving outside call numbers in the internal network such as corporate network. In FIG. 21, the call transfer server 10, provided in the internal network 12, is provided with the call transfer unit 38, the communications terminal selection unit 40, the presence management unit 42 and the position information management unit 44, and further newly provided with the dynamic phonebook display unit 230. In response to a call transfer request to the dynamic phonebook display unit 230 by page referencing provided from the mobile phone 36 of the mobile phone network 34 as an http server, an external network, the dynamic phonebook display unit 230 notifies, if it selects the extension phone 16-1 in the internal network 12 as a transfer destination, a key number 266 to the mobile phone 36 that has made a call transfer request, thus allowing the mobile phone 36 to issue a call origination request via the mobile phone network 34. When the call transfer unit 38 of the call transfer server 10 receives the key number 266 received as a result of the call origination request from the mobile phone network 34, the dynamic phonebook display unit 230 converts the number to an extension number and transfer the call to the extension phone 16-1.

Figure 22:
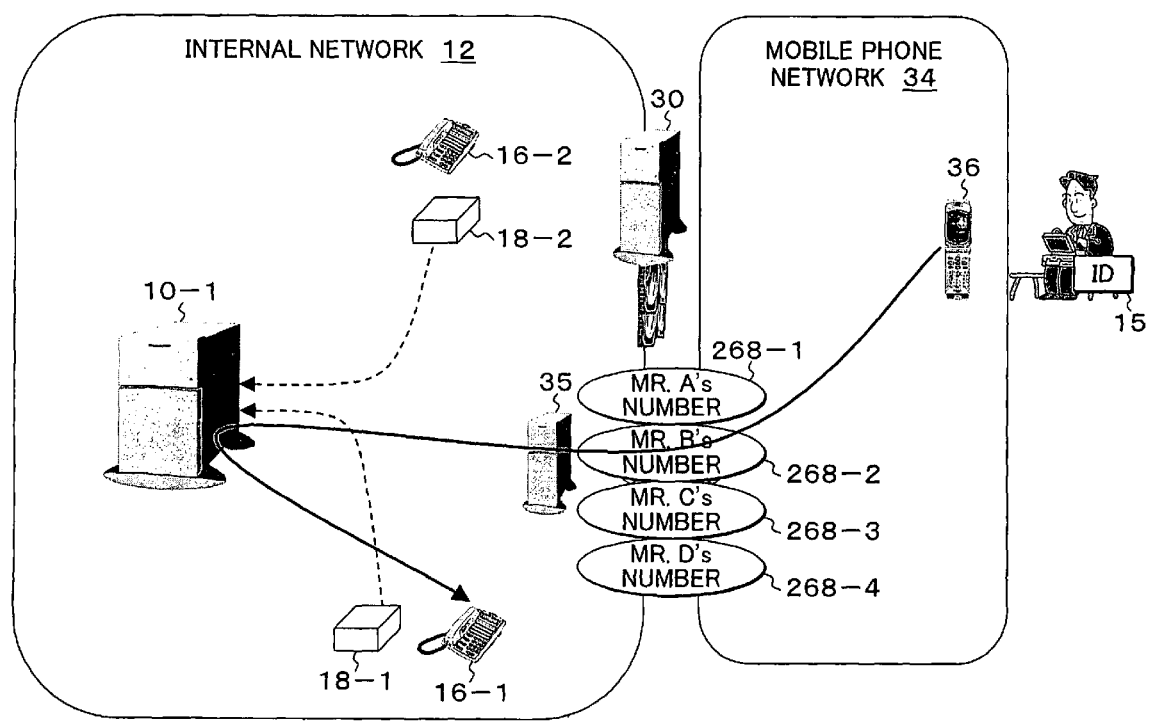
FIG. 22 is an explanatory view of usage status of outside call numbers when the present invention is not applied.

FIG. 22 is an extension number in the call transfer server 10-1 not equipped with the dynamic phonebook display unit 230 of FIG. 21. In this case, the SIP-PSTN gateway server 35, a relay point of the internal network 12 to the mobile phone network 34, receives call connections to a plurality of phone numbers 268-1 to 268-4, and the call transfer server 10 transfers calls by selecting the extension phone 16-1 from call terminator presence information, as a result of which it is necessary to hold and manage a large number of phone numbers for the internal network. In contrast, the embodiment in FIG. 21 allows call transfer from the mobile phone 36 of the mobile phone network 34 to an internal call terminator as a communications terminal using the key number 266, thus reducing phone numbers—numbers required for call from external networks to the internal network 12—down to one number, namely, the key number 266.

Figure 23A:
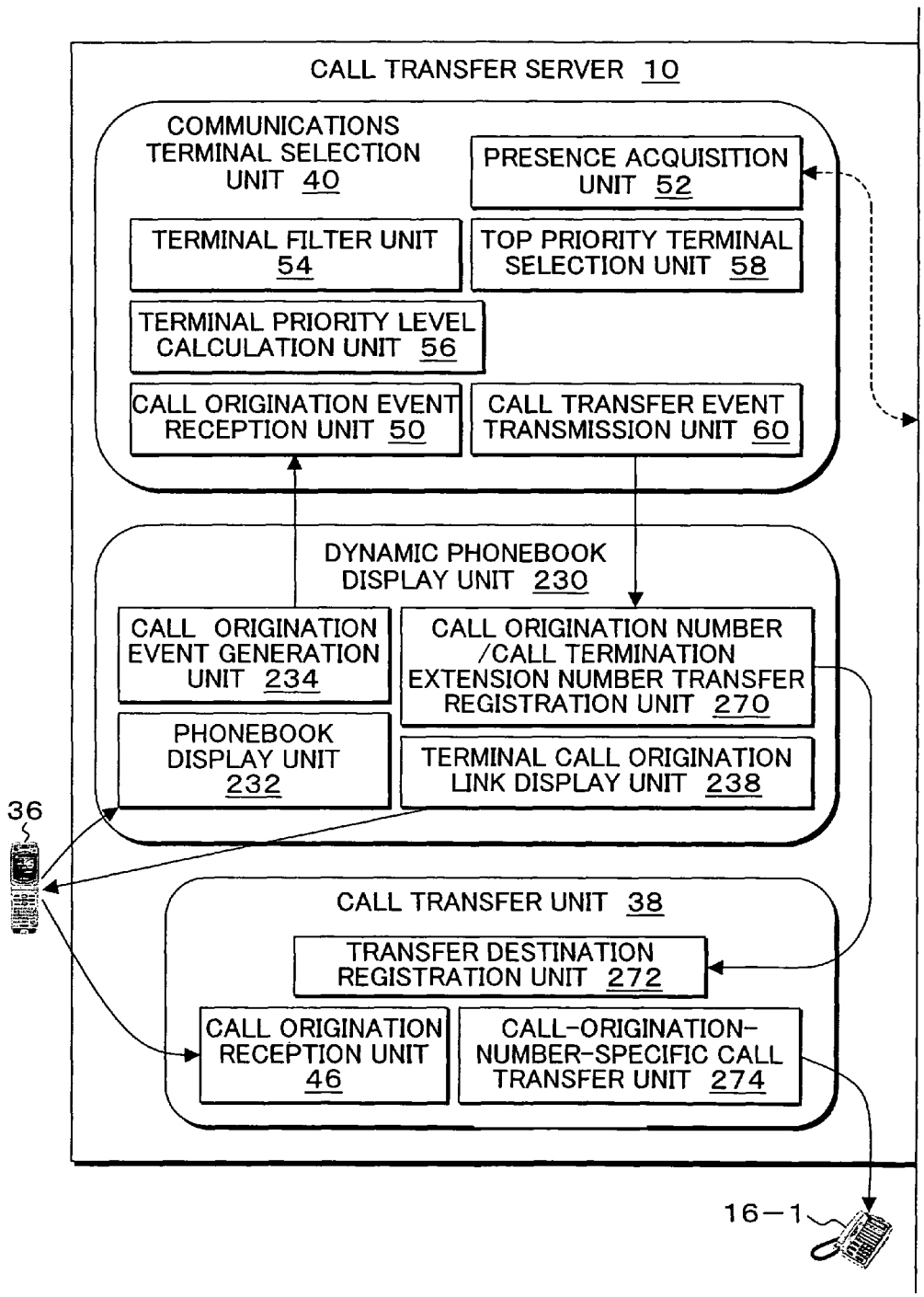
FIGS. 23A to 23C are block diagrams of the functional configurations of the call transfer server, secure gateway, and user clients in FIG. 21.
Figure 23B:
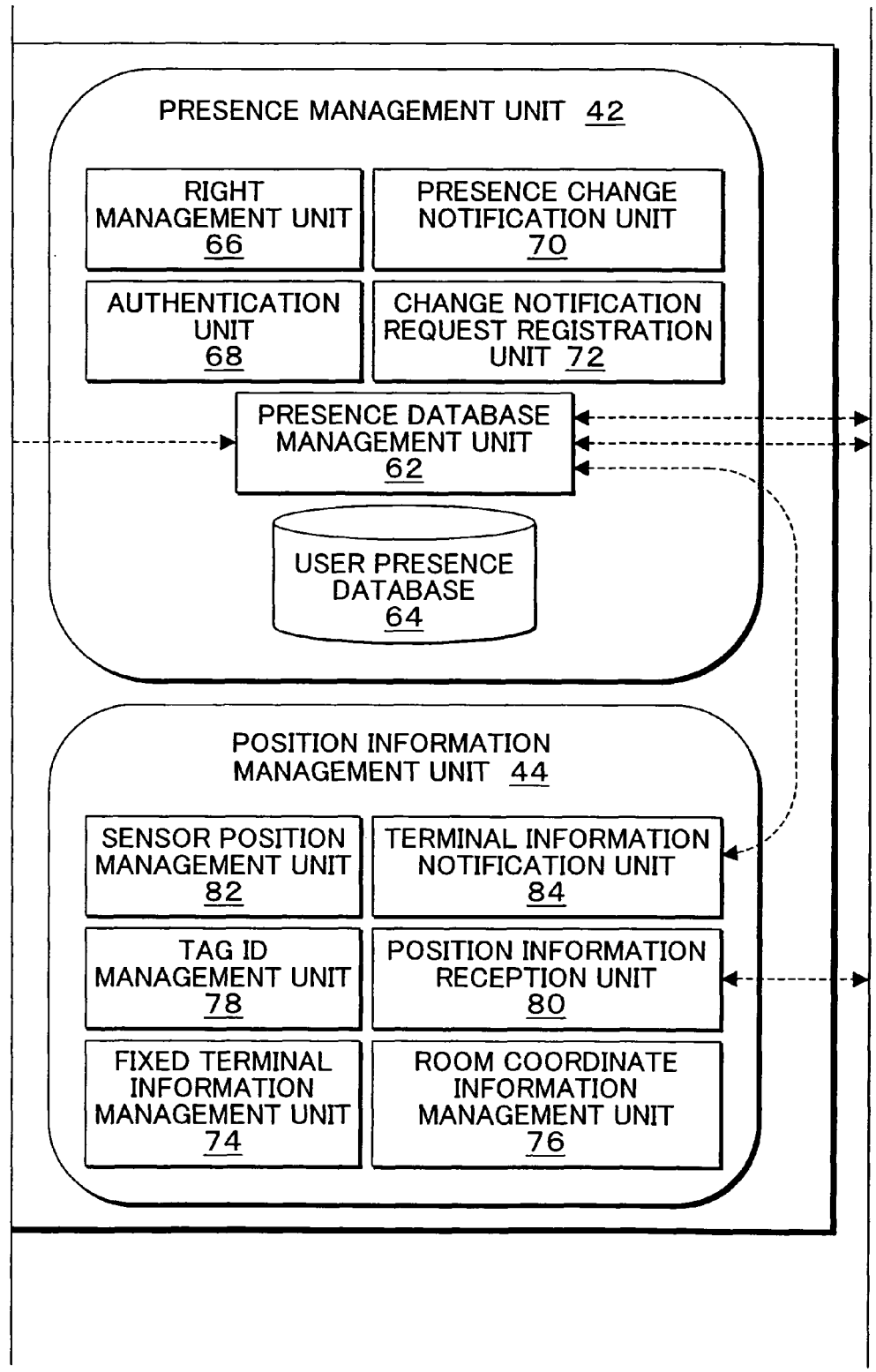
Figure 23C:
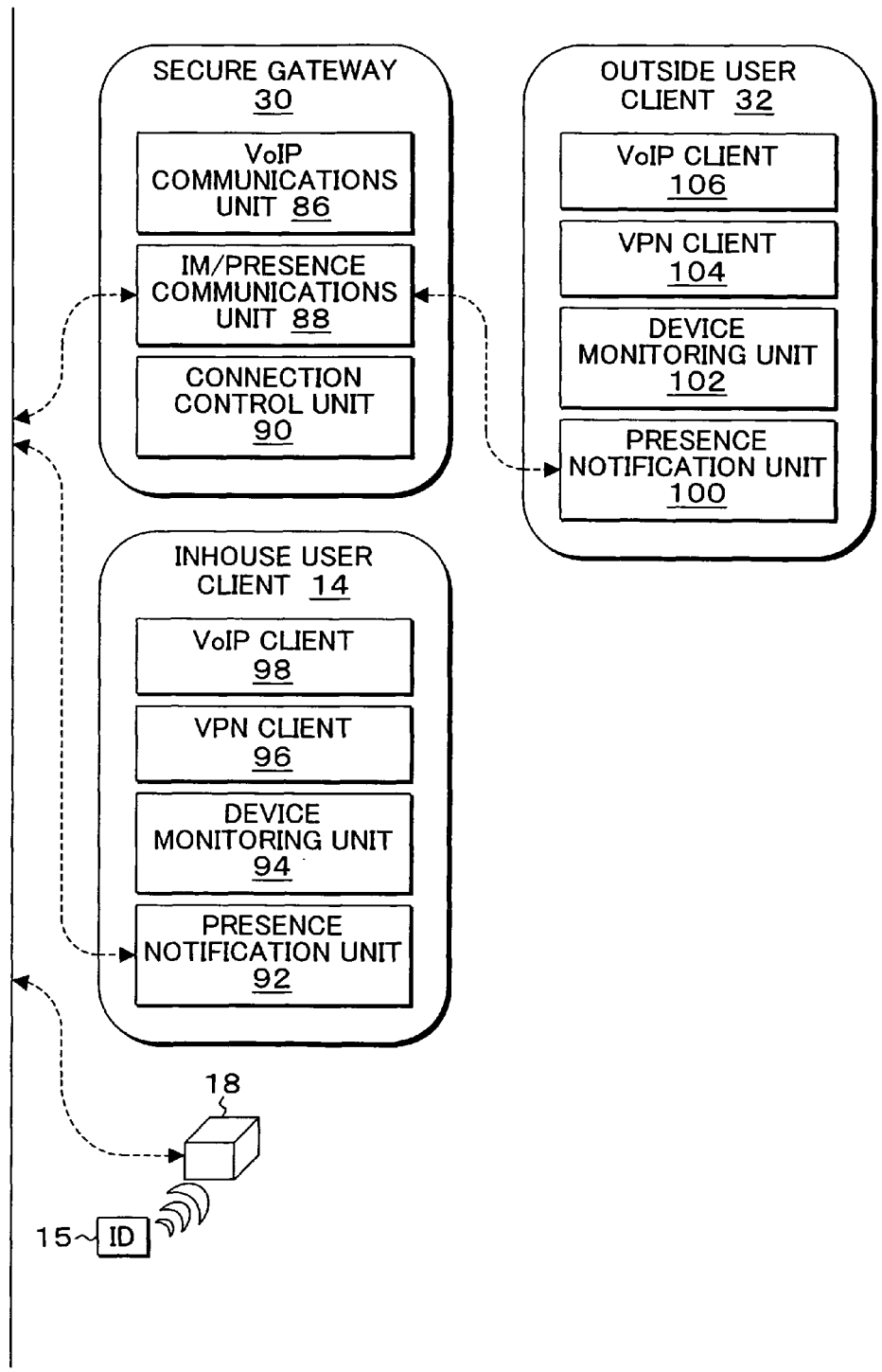

FIGS. 23A to 23C are block diagrams of the functional configurations of the call transfer server 10, the secure gateway 30, the outside client 32 and the inhouse user client 14 in the embodiment for saving outside call numbers shown in FIG. 21. In FIGS. 23A to 23C, the call transfer server 10 is newly provided with the dynamic phonebook display unit 230. The dynamic phonebook display unit 230 is provided with the phonebook display unit 232, the call origination event generation unit 234 and the terminal call origination link display unit 238 whose capabilities are the same as those for avoiding double charging shown in FIGS. 19A to 19C. The dynamic phonebook display unit 230 in the embodiment of FIGS. 23A to 23C is further provided with a call origination number/call termination extension number transfer registration unit 270. As a result of provision of the dynamic phonebook display unit 230, the call transfer unit 38 is newly provided with a transfer destination registration unit 272 and a call-origination-number-specific call transfer unit 274 in addition to the call origination reception unit 46.

Figure 24:
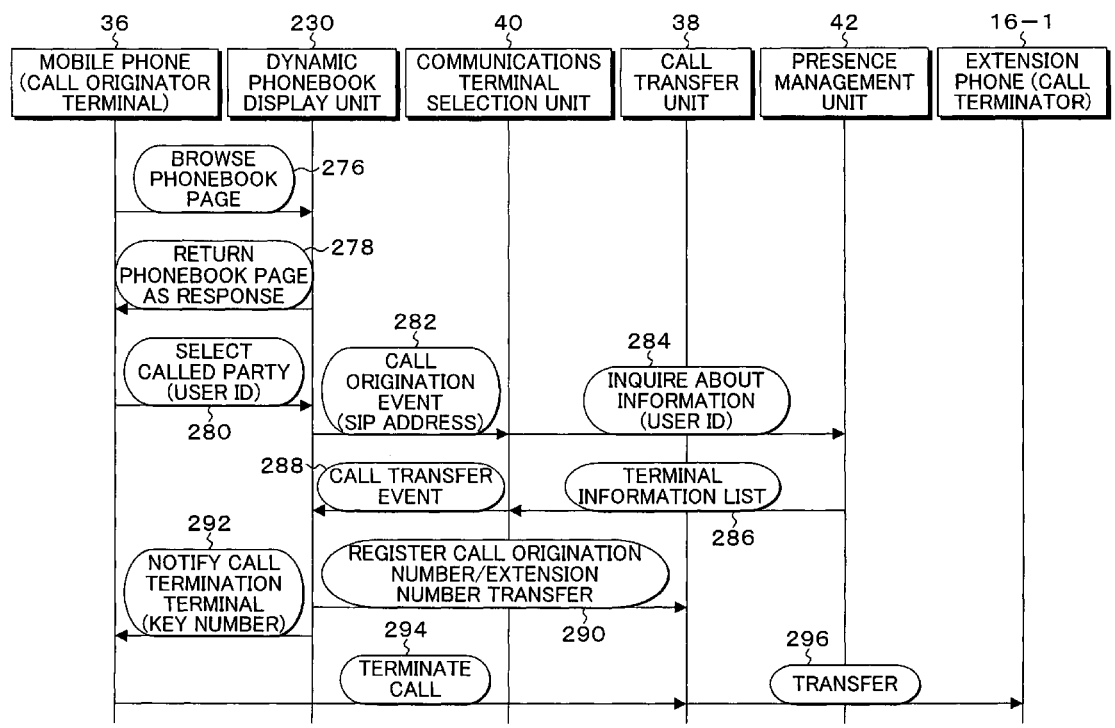
FIG. 24 is an explanatory view of a communications terminal selection sequence of the present invention for saving outside call numbers shown in FIGS. 23A to 23C.

FIG. 24 is an explanatory view of a communications terminal selection sequence of the present invention for saving outside call numbers shown in FIGS. 23A to 23C. In FIG. 24, phonebook page browsing 276 is performed on the dynamic phonebook display unit 230 functioning as an http server from the mobile phone 36 as the call originator terminal using the Web browsing capability of the mobile phone 36 and a specific URL, as with the embodiment of FIG. 11A and FIG. 11B. In response to a request for the phonebook page browsing 276, the dynamic phonebook display unit 230 creates a same browsing page 260 as that shown in FIG. 17, performing a phonebook page return 278 to the mobile phone 36. The phone book page 260 in FIG. 17 displays a list of staffers' names as call originators, with each staffer name serving as a clickable link. The user of the mobile phone 36 transmits the user ID to the dynamic phonebook display unit 230 through a called party selection 280 from among called parties in the browsing page 260 as shown in FIG. 17. The dynamic phonebook display unit 230 creates a call origination event 282 from the user ID received through the called party selection 280, notifying the event to the communications terminal selection unit 40. The communications terminal selection unit 40 receives a terminal information list 286 by making an information inquiry to the presence management unit 42 and specifies, for example, the extension number 16-1 as communications terminal to accompany with user presence information as call terminator, thus returning a call transfer event 288 to the dynamic phonebook display unit 230. The dynamic phonebook display unit 230 performs a call origination number/extension number transfer registration 290, made up of the call origination number of the mobile phone 36, a call originator's terminal, and the extension number of the selected extension number 16-1, in the call transfer unit 38. The dynamic phonebook display unit 230 also performs a call termination terminal notification 292 having a key number to the mobile phone 36. More specifically, the dynamic phonebook display unit 230 sends the confirmation screen 262, and if the user of the mobile phone 36 clicks the "Yes" link, a call termination 294 for the key number is carried out to the call transfer unit 38. In response to the call termination 294 using the key number, the call transfer unit 38 converts the call origination number to the extension number based on the already registered call origination number/extension number transfer registration 290, transferring the call to the extension phone 16-1 and thereby establishing a call path with the mobile phone 36.

Figure 25B:
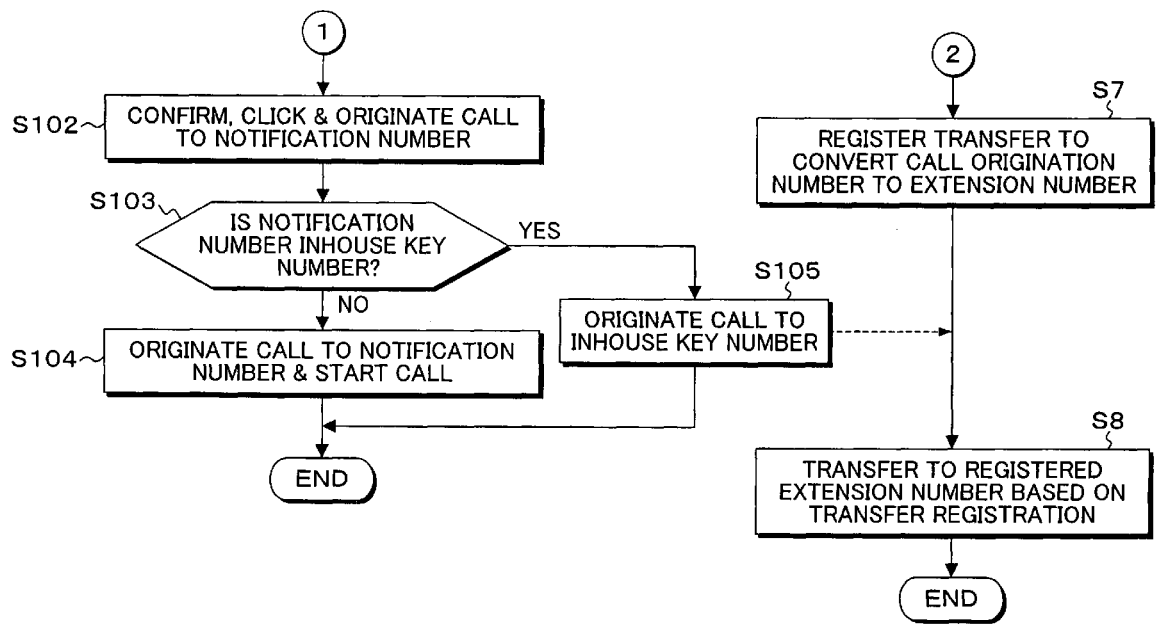

FIGS. 25A and 25B are flowcharts of a call terminal selection processing of the present invention including the double charging avoidance processing in FIG. 15 and the outside call number saving processing in FIG. 21. In FIG. 25A and FIG. 25B, if the dynamic phonebook display unit 230 receives a call transfer event from an external communications terminal such as mobile phone through Web page referencing and selects a communications terminal at Step S1, then the dynamic phonebook display unit 230 verifies at Step S2 whether the selected communications terminal is an inhouse extension, and, if so, proceeds to Step S3 where the unit converts the call origination number to an extension number for registration. In response to the transfer registration, the call transfer unit 38 performs a transfer registration for converting the call origination number to the extension number at Step S7. Next at Step S4, the dynamic phonebook display unit 230 sets the key number as notification number at Step S4 and creates a confirmation screen to be displayed on the call originator terminal at Step S6, notifying the call originator terminal 11. The call originator terminal 11 receives the confirmation screen from the dynamic phonebook display unit 230 of the call transfer server 10 at Step S101, and when the user clicks a party on the confirmation screen after confirmation at Step S102, a call is transmitted to the notification number. Next at Step S103, the call originator terminal 11 verifies whether the notification number is an inhouse key number, and, since it is in this case, it transmits a call to the inhouse key number at Step S105. In response to the call origination to the inhouse key number from the call originator terminal 11, the call transfer unit 38 of the call transfer server 10 transfers the call to the registered extension number based on the transfer registration at Step S8. A description of the processing for avoiding double charging will be given next with reference to the flowchart in FIG. 25A and FIG. 25B. If the dynamic phonebook display unit 230 receives a call transfer event through Web page browsing by a mobile phone and if, at Step S2, the selected call terminal is found to be an outside terminal, the dynamic phonebook display unit 230 proceeds to Step S5 where the unit converts the number in the call transfer event to the converted PSTN phone number for use as notification number. At Step S6, the dynamic phonebook display unit 230 creates a confirmation number to be displayed that is linked to the call originator terminal, transmitting the number to the call originator terminal 11. The call originator terminal 11 receives the confirmation screen at Step S101, and if the "Yes" link is clicked in FIG. 18 after confirmation at Step S102, a call is transmitted to the notification number. Next at Step S103, since the notification number is not the inhouse key number, the call originator terminal 11 proceeds to Step S104 where the terminal 11 transmits a call to the notification number, thus starting call. That is, it is possible to avoid double charging as a result of call transfer via the call transfer server 10 by establishing a direct call connection to the notified notification number from the call originator terminal 11. It is to be noted that while the aforementioned embodiments take as examples the terminal selection processing in call terminals such as fixed phone, mobile phone and VoIP phone, the present invention is not limited thereto and may be applied as is to a terminal selection processing in transmission/reception of instant message, http and mail between data communications terminals. The present invention, designed to provide programs for performing a communications terminal selection processing in a call transfer server, allows for implementation of the programs as the steps of the flowcharts shown in FIG. 11A, FIG. 11B, FIG. 25A and FIG. 25B. The call transfer server 10 for executing the programs is implemented by computer hardware resources. Therefore, the computer is installed with programs for performing the communications terminal selection processing of the present invention in the hard disk drive, and loads necessary programs from the hard disk drive during bootup into RAM for execution by the CPU. Moreover, the path from the CPU is provided with a telephone network required for extension phone network and LAN network, allowing call and data communication with external communications terminal via the Internet or wireless LAN. Further, the present invention, designed to provide a storage medium storing programs for performing the terminal selection processing in a call transfer server, includes, as the storage medium, not only CD-ROM, memory card and DVD but also hard disk provided for a computer system, server database existing on a network, and further transmission medium for communications circuit for the Internet and so on. The present invention can include any appropriate modifications without impairing the objectives and advantages thereof and is not subject to any limitations by the numerical values indicated in the above embodiments.

What is claimed is:

1. A method of transferring data between different types of terminal devices, comprising:

acquiring a position information at which a call terminator is currently present from a position information management device provided in a call transfer server machine upon receipt of a call origination request from a terminal device of a call originator;

acquiring a presence information including a plurality of available pieces of terminal information, specified based on the position information that is acquired, from a presence management device provided in the call transfer server machine;

selecting a specific terminal device based on the presence information from among a plurality of call terminator available terminal devices in which the call terminator at least defines in advance whether call quality or call charge takes priority for each of the plurality of call terminator available terminal devices through a communication terminal device selection device provided in the call transfer server machine; and notifying the specific terminal device as a transfer destination for the terminal device of the call originator by a call transfer device provided in the call transfer server machine to allow a call transfer, and transferring a call from the call originator to the transfer destination, wherein the communication terminal device selection device compares a first evaluation value held by the call originator with a second evaluation value held by the call terminator, selects the specific terminal device by using a terminal filter that compares the first evaluation value held by the call originator with the second evaluation value held by the call terminator, and defines a terminal device selection condition held by the call terminator from a result of the comparison of which is larger or smaller of the first evaluation value held by the call originator and the second evaluation value held by the call terminator, wherein the first evaluation value represents a call priority level of the call originator and the second evaluation value represents a busyness of the call terminator, wherein the terminal device selection condition is set in advance in the terminal filter by comparing the first evaluation value held by the call originator and the second evaluation value held by the call terminator for selecting a specific terminal, wherein a terminal device type in the terminal device selection condition is set as one of phone, instant message, http and mail as a first terminal attribute in the terminal information, and wherein details of the phone are set as one of fixed phone, mobile phone, PHS, and VoIP phone as a second terminal attribute in the terminal information, wherein the terminal device selection condition is set in advance in the terminal filter for selecting a call terminal device when the busyness of the call terminator is lower than the call priority level of the originator and for selecting recorded service in any other cases, and wherein the selecting of the specific terminal device includes selecting a terminal device with high call quality or with low communications charge based on a priority level P when the plurality of call terminal devices are selected as terminal device candidates based on the terminal filter; and setting a weighted communication bandwidth, weighted communications delay, weighted time charging, weighted data charging, and priority level value as the priority level information, finding, by the communication terminal device selection device, the priority level P using P ={log (bandwidth × W1}−{(delay) ×W2}−{time charging (/min) ×W3}−[data charging (/1Kbyte) ×W4]+V(1), wherein W1, W2, W3 and W4 are weights used to set the weighted communication bandwidth, the weighted communications delay, the weighted time charging and the weighted data charging, and wherein V is a priority level set to an arbitrary value by users as necessary to adjust the priority level P; and selecting the specific terminal device with the highest priority level P based on said finding in absolute value so as to allow selection of the specific terminal device with high quality and low charge.

2. The method of transferring data between different types of terminal devices according to claim 1, wherein the terminal selection condition is set in advance in the terminal filter for selecting the specific terminal device or service through comparison of job titles of the call originator and the call terminator.

3. The method of transferring data between different types of terminal devices according to claim 2, wherein the terminal device selection condition is set in advance in the terminal filter for selecting a call terminal device when the call terminator is lower than the call originator in job title and for selecting recorded service in any other cases.

4. The method of transferring data between different types of terminal devices according to claim 1, wherein the terminal device selection includes, when selection of a terminal device with high call quality is desired, setting weights for communications charge in the priority level information to zero, and selecting a call terminal device with highest priority level.

5. The method of transferring data between different types of terminal devices according to claim 1, wherein the terminal device selection includes, when selection of a terminal device with low call charge is desired, setting weights for communications bandwidth in the priority level information to zero, and selecting a call terminal device with highest priority level in absolute value.

6. The method of transferring data between different types of terminal devices according to claim 1, wherein when selection of a specific terminal device is desired independently of call quality and call charge, a priority level value of a terminal device to be selected in the priority level information is set to a large value so as to assign the highest priority level in absolute value, with other weights being set to zero.

7. The method of transferring data between different types of terminal devices according to claim 1, when a communication terminal device in an external network is selected as a transfer destination terminal device by Web page referencing from a call originator's terminal device in an external network, further comprising:

a dynamic phonebook display step of notifying the call originator's terminal device of a phone number of a transfer destination terminal device so as to allow the call originator's terminal device to directly originate a call.

8. The method of transferring data between different types of terminal devices according to claim 7, wherein the dynamic phonebook display step includes creating a confirmation screen that includes the phone number of the transfer destination terminal device as a link and transferring the confirmation screen to the call originator's terminal device.

9. The method of transferring data between different types of terminal devices according to claim 1, when a communication terminal device in an internal network is selected as a transfer destination terminal device by Web page referencing from a call originator's terminal device in an external network, further comprising:
- a dynamic phonebook display step of notifying the call originator's terminal device of a key phone number so as to allow the call originator's terminal device to make a call origination request, and converting the key phone number received through the call origination request to an internal network phone number of a transfer destination terminal so as to allow call transfer.

10. The method of transferring data between different types of terminal devices according to claim 9, wherein the dynamic phonebook display step includes creating a confirmation screen that includes the key phone number as a link and transferring the confirmation screen to the call originator's terminal device.

11. A call transfer machine for transferring data between different types of terminal devices, comprising:
- a position information management device acquiring a position information at which a call terminator is currently present upon receipt of a call origination request from a terminal device of a call originator;
- a presence information management device acquiring a presence information including a plurality of available pieces of terminal information based on the position information;
- a communication terminal selection device selecting a specific terminal device based on the presence information from among a plurality of call terminator available terminal devices in which the call terminator at least defines in advance whether call quality or call charge takes priority for each of the plurality of call terminator available terminal devices; and
- a call transfer device notifying a specific terminal device as a transfer destination to allow a call transfer,
- wherein the communication terminal selection device compares a first evaluation value held by a call originator with a second evaluation value held by the call terminator, selects the specific terminal device by using a terminal filter that compares the first evaluation value held by the call originator with the second evaluation value held by the call terminator, and defines a terminal device selection condition held by the call terminator from a result of the comparison of which is larger or smaller of the first evaluation value held by the call originator and the second evaluation value held by the call terminator,
- wherein the first evaluation value represents a call priority level of the call originator and the second evaluation value represents a busyness of the call terminator,
- wherein the terminal device selection condition is set in advance in the terminal filter by comparing the first evaluation value held by the call originator and the second evaluation value held by the call terminator for selecting the specific terminal,
- wherein a terminal device type in the terminal device selection condition is set as one of phone, instant message, http and mail as a first terminal attribute in the terminal information, and wherein details of the phone are set as one of fixed phone, mobile phone, PHS, and VoIP phone as a second terminal attribute in the terminal information,
- wherein the terminal device selection condition is set in advance in the terminal filter for selecting a call terminal device when the busyness of the call terminator is lower than the call priority level of the originator and for selecting recorded service in any other cases,
- wherein the selecting the specific terminal device includes selecting a terminal device with high call quality or with low communications charge based on a priority level P when the plurality of call terminator available terminal devices are selected as terminal device candidates based on the terminal filter; and
- setting a weighted communication bandwidth, weighted communications delay, weighted time charging, weighted data charging, and priority level value as the priority level information,
- finding, by the communication terminal device selection device, the priority level P using P ={log (bandwidth × W1}−{(delay) ×W2}−{time charging (/min) ×W3}+[data charging (/1Kbyte) ×W4]+V(1), wherein W1, W2, W3 and W4 are weights used to set the weighted communication bandwidth, the weighted communications delay, the weighted time charging and the weighted data charging, and wherein V is a priority level set to an arbitrary value by users as necessary to adjust the priority level P; and
- selecting the specific terminal device with the highest priority level P based on said finding in absolute value so as to allow selection of the specific terminal device with high quality and low charge.

12. A non-transitory computer-readable storage medium having therein stored a program for causing a computer to execute:
- acquiring a position information at which a call terminator is currently present from a position information management device provided in a call transfer server machine upon receipt of a call origination request from a terminal device of a call originator;
- acquiring a presence information including a plurality of available pieces of terminal information, specified based on the position information that is acquired, from a presence management device provided in the call transfer server machine;
- selecting a specific terminal device based on the presence information from among a plurality of call terminator available terminal devices in which the call terminator at least defines in advance whether call quality or call charge takes priority for each of the plurality of call terminator available terminal devices through a communication terminal device selection device provided in the call transfer server machine; and
- notifying the specific terminal device as a transfer destination for the terminal device of the call originator by a call transfer device provided in the call transfer server machine to allow a call transfer, and transferring a call from the call originator to the transfer destination,
- wherein the communication terminal device selection device compares a first evaluation value held by the call originator with a second evaluation value held by the call terminator, selects the specific terminal device by using a terminal filter that compares the first evaluation value held by the call originator with the second evaluation value held by the call terminator, and defines a terminal device selection condition held by the call terminator from a result of the comparison of which is larger or smaller of the first evaluation value held by the call originator and the second evaluation value held by the call terminator,
- wherein the first evaluation value represents a call priority level of the call originator and the second evaluation value represents a busyness of the call terminator,
- wherein the terminal device selection condition is set in advance in the terminal filter by comparing the first evaluation value held by the call originator and the second evaluation value held by the call terminator for selecting a specific terminal, wherein a terminal device type in the terminal device selection condition is set as one of phone, instant message, http and mail as a first terminal attribute in the terminal information, and wherein details of the phone are set as one of fixed phone, mobile phone, PHS, and VoIP phone as a second terminal attribute in the terminal information, wherein the terminal device selection condition is set in advance in the terminal filter for selecting a call terminal device when the busyness of the call terminator is lower than the call priority level of the originator and for selecting recorded service in any other cases, wherein the selecting of the specific terminal device includes selecting a terminal device with high call quality or with low communications charge based on a priority level P when the plurality of call terminator available terminal devices are selected as terminal device candidates based on the terminal filter; and setting a weighted communication bandwidth, weighted communications delay, weighted time charging, weighted data charging, and priority level value as the priority level information, finding, by the communication terminal device selection device, the priority level P using P ={log (bandwidth × W1}−{(delay) ×W2}−{time charging (/min) ×W3}+ [data charging (/1Kbyte) ×W4]+V(1), wherein W1, W2, W3 and W4 are weights used to set the weighted communication bandwidth, the weighted communications delay, the weighted time charging and the weighted data charging, and wherein V is a priority level set to an arbitrary value by users as necessary to adjust the priority level P; and selecting the specific terminal device with the highest priority level P based on said finding in absolute value so as to allow selection of the specific terminal device with high quality and low charge.

* * * * *

UNITED STATES PATENT AND TRADEMARK OFFICE
CERTIFICATE OF CORRECTION

PATENT NO. : 8,046,474 B2
APPLICATION NO. : 10/923747
DATED : October 25, 2011
INVENTOR(S) : Tetsuya Kato et al.

It is certified that error appears in the above-identified patent and that said Letters Patent is hereby corrected as shown below:

Column 20, Line 6-8, In Claim 1, delete "P ={log (bandwidth ×W1}-{(delay) ×W2}-{time charging (/min) ×W3}-[data charging (/1Kbyte) ×W4]+V(1)," and insert -- P ={log (bandwidth)×W1}-{(delay)×W2}-{time charging (¥/min)×W3}-[data charging (¥/1Kbyte)×W4]+V(1), --, therefor.

Column 22, Line 12-14, In Claim 11, delete "P ={log (bandwidth ×W1}-{(delay) ×W2}-{time charging (/min) ×W3}+[data charging (/1Kbyte) ×W4]+V(1)," and insert -- P ={log (bandwidth)×W1}-{(delay)×W2}-{time charging (¥/min)×W3}-[data charging (¥/1Kbyte)×W4]+V(1), --, therefor.

Column 24, Line 6-8, In Claim 12, delete "P ={log (bandwidth ×W1}-{(delay) ×W2}-{time charging (/min) ×W3}+[data charging (/1Kbyte) ×W4]+V(1)," and insert -- P ={log (bandwidth)×WI}-{(delay)×W2}-{time charging (¥/min)×W3}-[data charging (¥/1 Kbyte)×W4]+V(1), --, therefor.

Signed and Sealed this
Nineteenth Day of June, 2012

David J. Kappos
*Director of the United States Patent and Trademark Office*